(12) United States Patent
Koreeda et al.

(10) Patent No.: US 7,813,252 B2
(45) Date of Patent: Oct. 12, 2010

(54) OPTICAL PICK-UP

(75) Inventors: Daisuke Koreeda, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 241 days.

(21) Appl. No.: 12/195,639

(22) Filed: Aug. 21, 2008

(65) Prior Publication Data
US 2009/0052305 A1    Feb. 26, 2009

(30) Foreign Application Priority Data
Aug. 23, 2007   (JP)   ............................. 2007-217313

(51) Int. Cl.
*G11B 7/00*   (2006.01)
(52) U.S. Cl. ........................ 369/112.23; 369/112.08; 369/94
(58) Field of Classification Search ............ 369/112.23, 369/112.25, 112.01, 112.05, 112.08, 94, 369/44.23, 44.37
See application file for complete search history.

(56) References Cited

U.S. PATENT DOCUMENTS

| | | | |
|---|---|---|---|
| 7,206,276 B2 * | 4/2007 | Kimura et al. | 369/112.08 |
| 7,245,407 B2 * | 7/2007 | Komma | 369/112.15 |
| 7,430,159 B2 | 9/2008 | Koreeda et al. | |
| 7,443,778 B2 * | 10/2008 | Komma | 369/112.08 |
| 2004/0047269 A1 | 3/2004 | Ikenaka et al. | |
| 2005/0002118 A1 | 1/2005 | Maruyama et al. | |
| 2005/0078593 A1 * | 4/2005 | Maruyama et al. | 369/112.23 |
| 2005/0281173 A1 | 12/2005 | Koreeda et al. | |
| 2006/0181978 A1 | 8/2006 | Koreeda et al. | |
| 2007/0075223 A1 | 4/2007 | Murao et al. | |
| 2007/0211599 A1 * | 9/2007 | Koike | 369/112.05 |
| 2008/0074976 A1 | 3/2008 | Nishikawa et al. | |
| 2009/0262635 A1 * | 10/2009 | Kimura et al. | 369/112.24 |

FOREIGN PATENT DOCUMENTS

| | | |
|---|---|---|
| JP | 9-306024 | 11/1997 |
| JP | 2004-247025 | 9/2004 |

OTHER PUBLICATIONS

English language Abstract of JP 9-306024, Nov. 28, 1997.
English language Abstract of JP 2004-247025, Sep. 2, 2004.

* cited by examiner

*Primary Examiner*—Thang V Tran
(74) *Attorney, Agent, or Firm*—Greenblum & Bernstein P.L.C.

(57) ABSTRACT

There is provided an optical pick-up including first to third light sources respectively emitting first to third light beams, a first coupling lens, and an objective lens formed to converge each of the first, second and third light beams onto the first, second and third optical discs, respectively. The objective lens has a step structure including a plurality of concentrically formed refractive surface zones divided by steps, the step structure having a function of giving, at each step, an optical path length difference of approximately $2\lambda_1$ to the first light beam. The first coupling lens causes the first light beam to be incident on the objective lens as a converging beam. The objective lens is positioned to satisfy a condition:

$$-0.35 < f2 \times M2 - f1 \times M1 < -0.07 \qquad (1).$$

17 Claims, 13 Drawing Sheets

-0.005  0.005
SPHERICAL ABERRATION

-0.005  0.005
SPHERICAL ABERRATION

-0.005  0.005
SPHERICAL ABERRATION

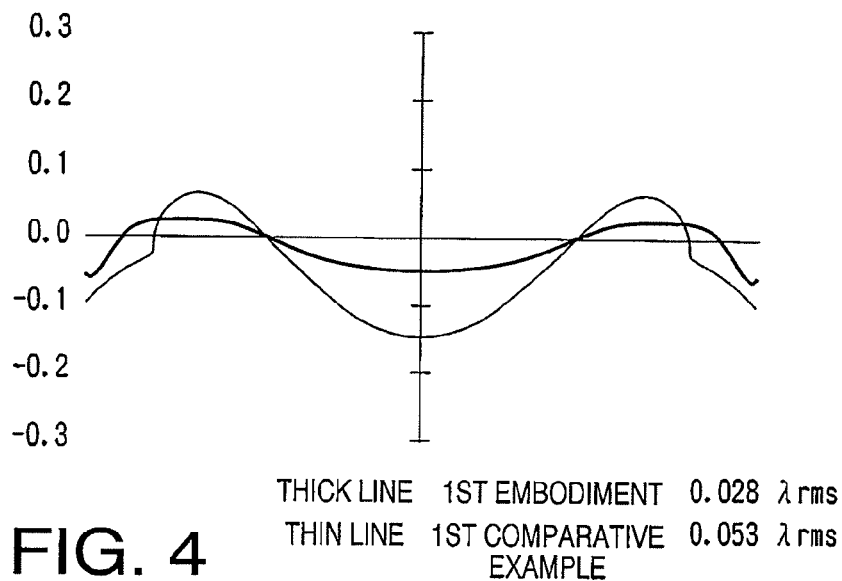
FIG. 4
| THICK LINE | 1ST EMBODIMENT | 0.028 λrms |
| THIN LINE | 1ST COMPARATIVE EXAMPLE | 0.053 λrms |
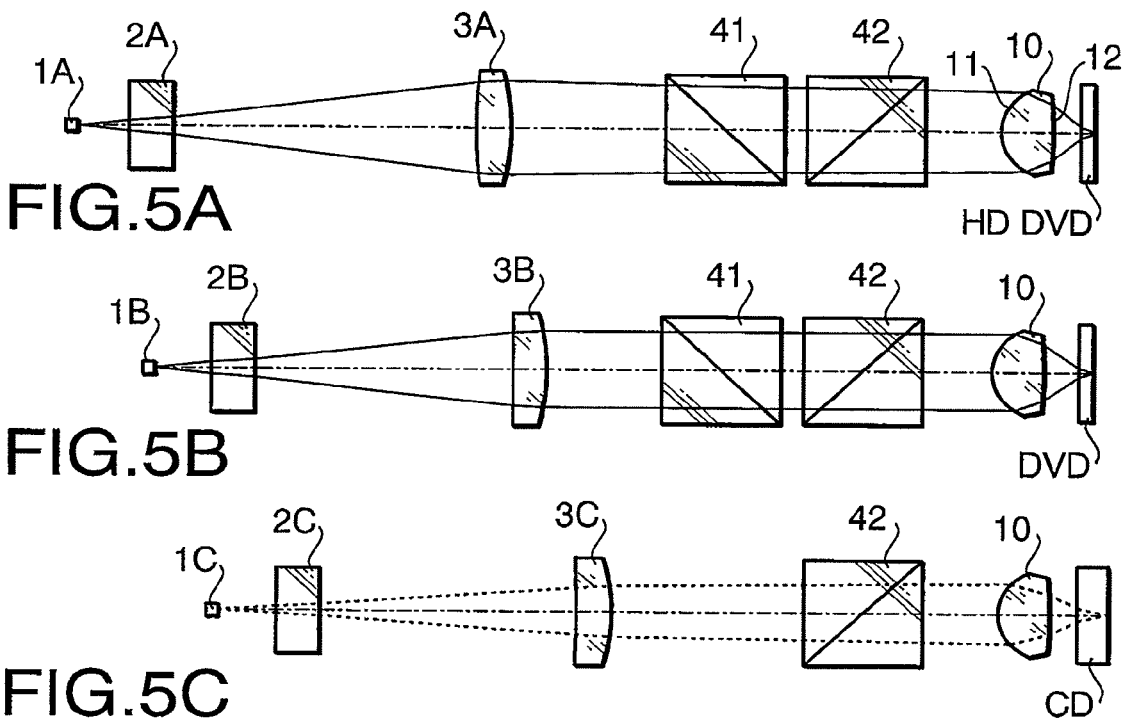
FIG.5A
FIG.5B
FIG.5C

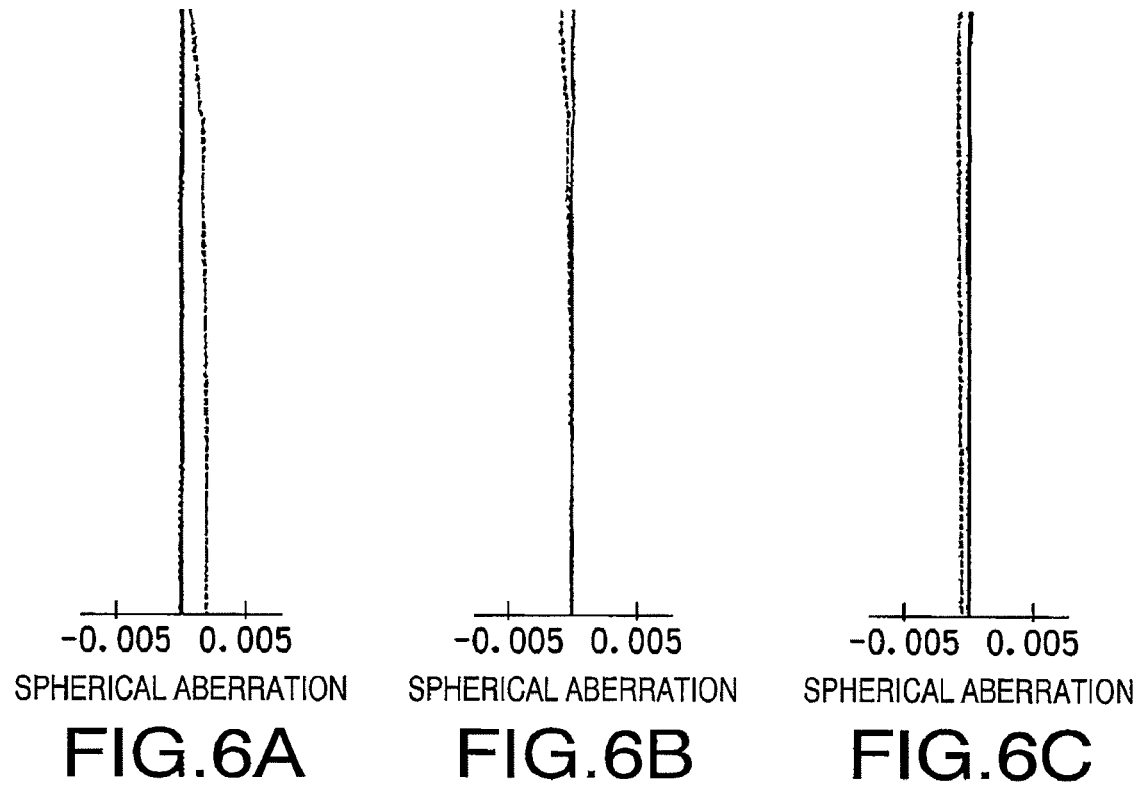
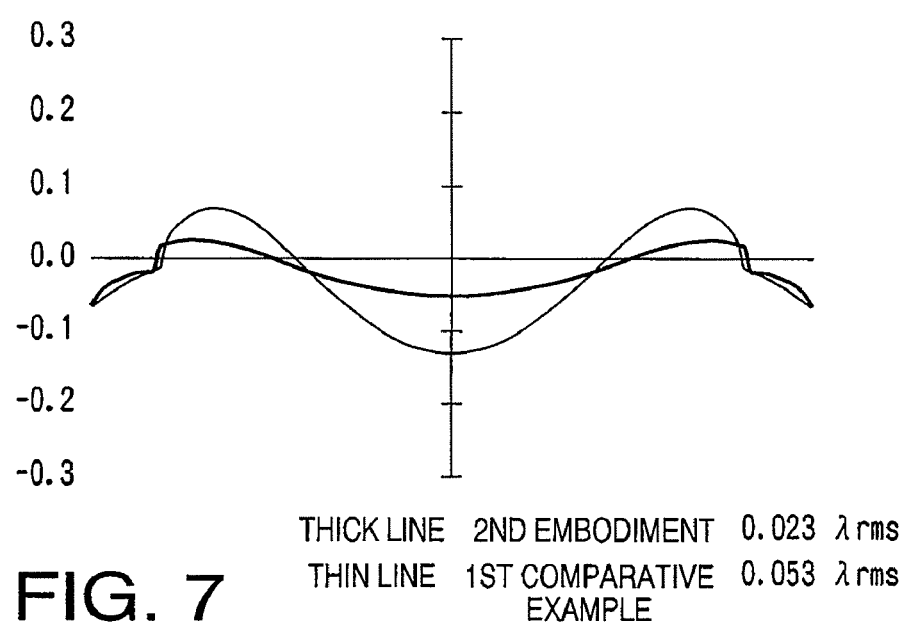

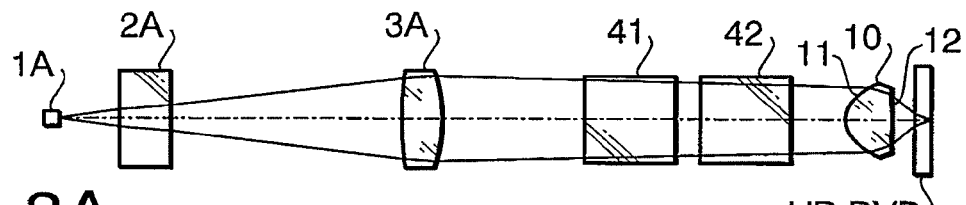
FIG.8A
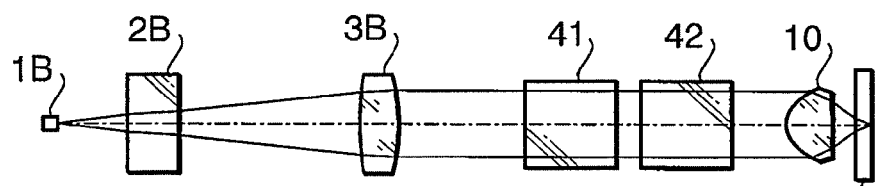
FIG.8B
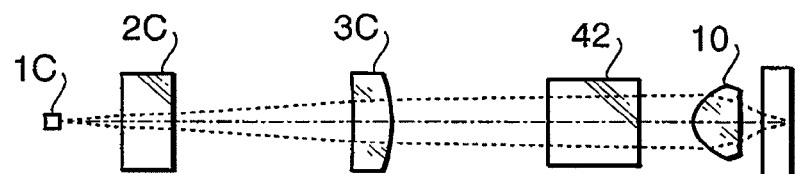
FIG.8C
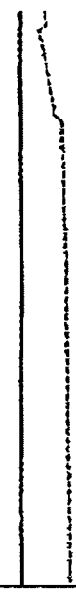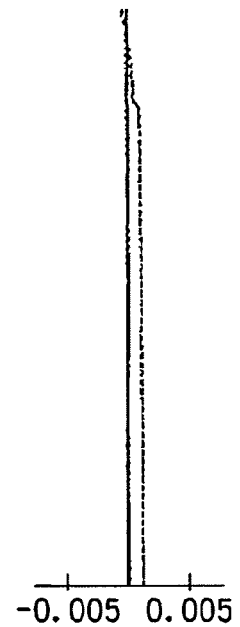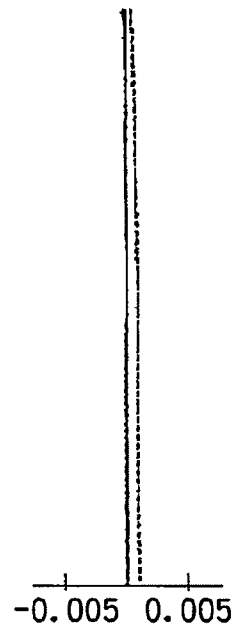
-0.005　0.005
SPHERICAL ABERRATION
FIG.9A
-0.005　0.005
SPHERICAL ABERRATION
FIG.9B
-0.005　0.005
SPHERICAL ABERRATION
FIG.9C THICK LINE 3RD EMBODIMENT 0.014 λ rms
THIN LINE 2ND COMPARATIVE EXAMPLE 0.068 λ rms

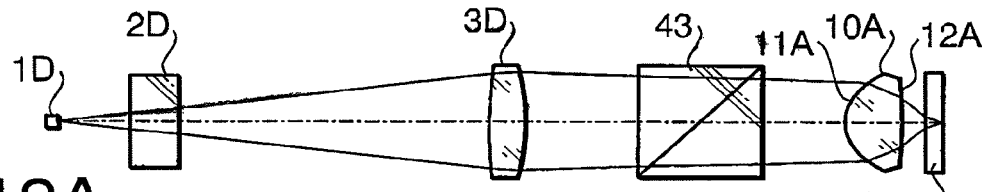
FIG.12A
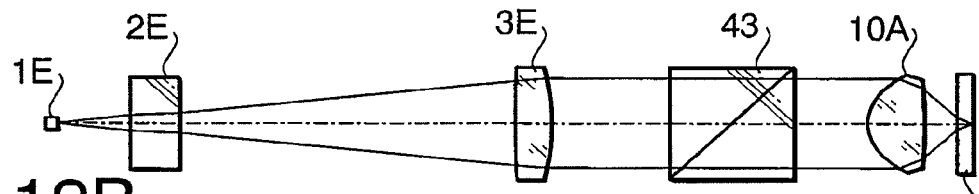
FIG.12B
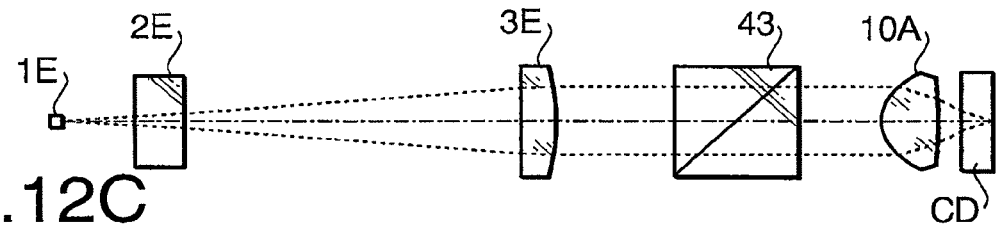
FIG.12C
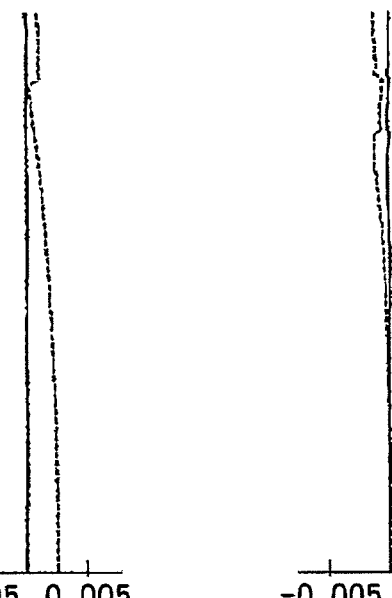
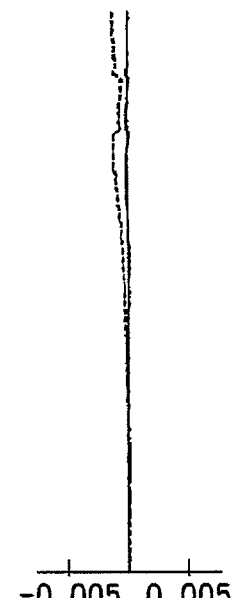
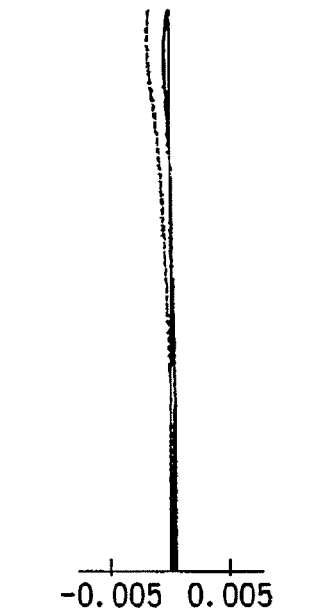
FIG.13A  FIG.13B  FIG.13C

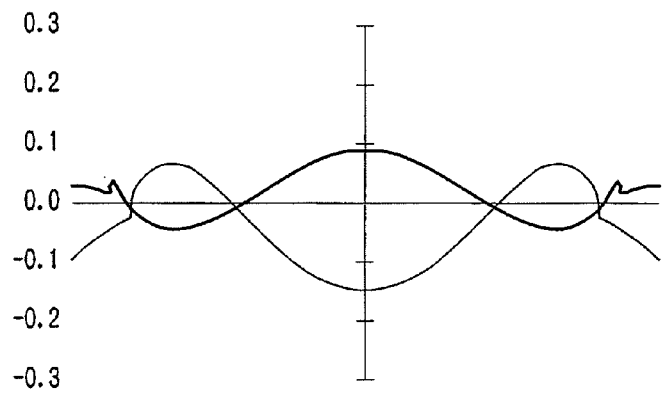
FIG.14
THICK LINE 4TH EMBODIMENT 0.032 λ rms
THIN LINE 1ST COMPARATIVE 0.053 λ rms
EXAMPLE
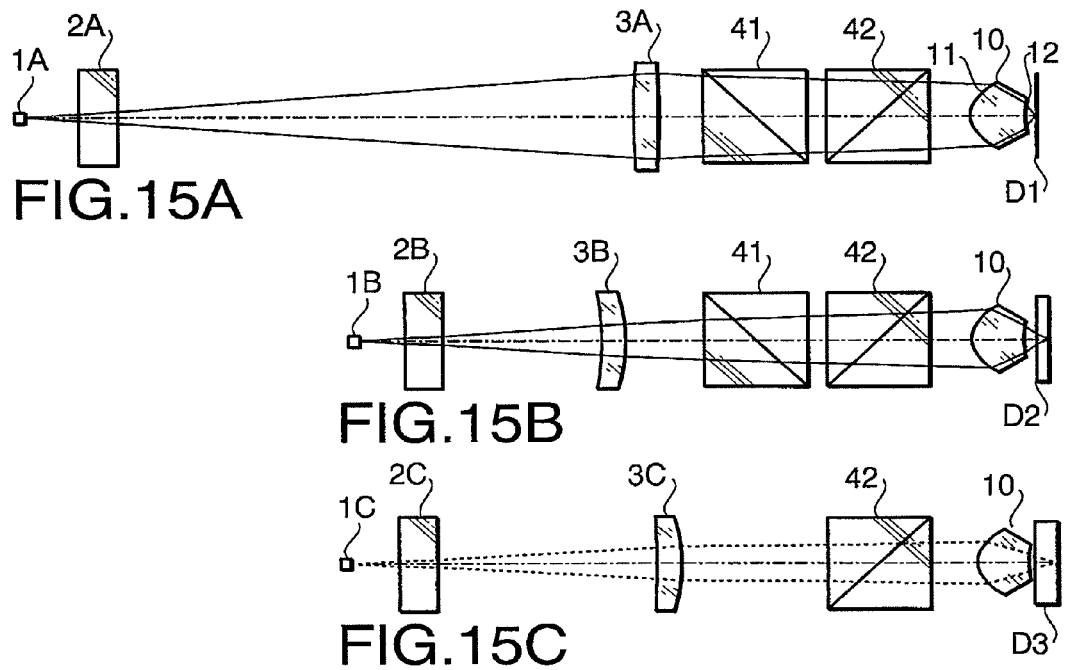
FIG.15A
FIG.15B
FIG.15C

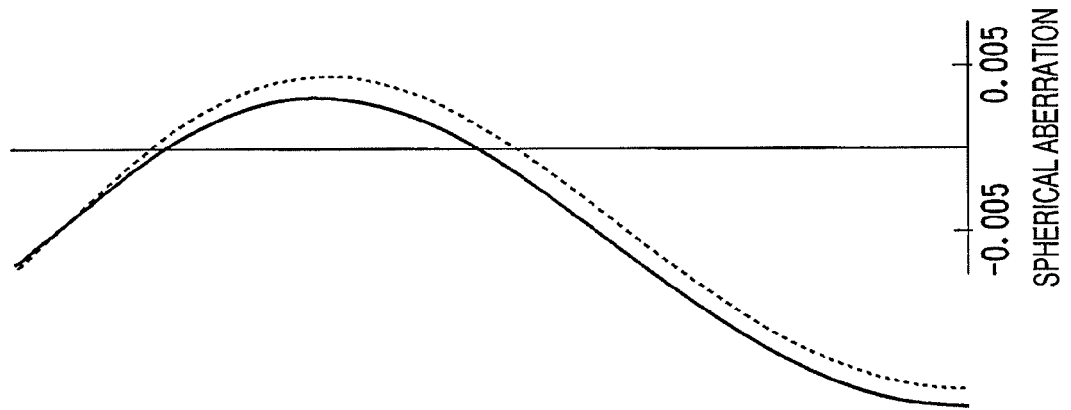
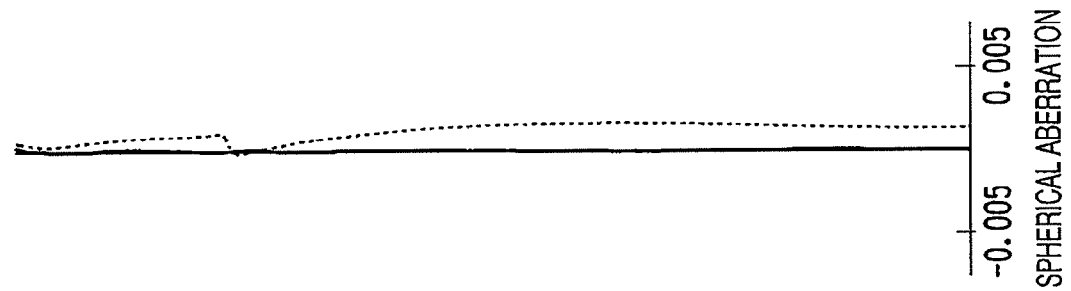
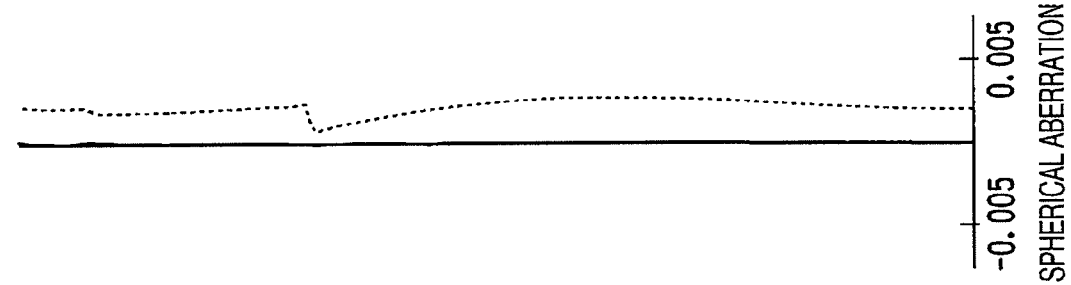

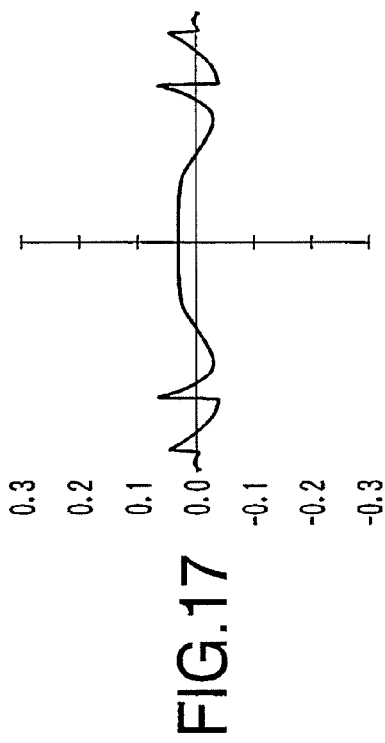
FIG. 17
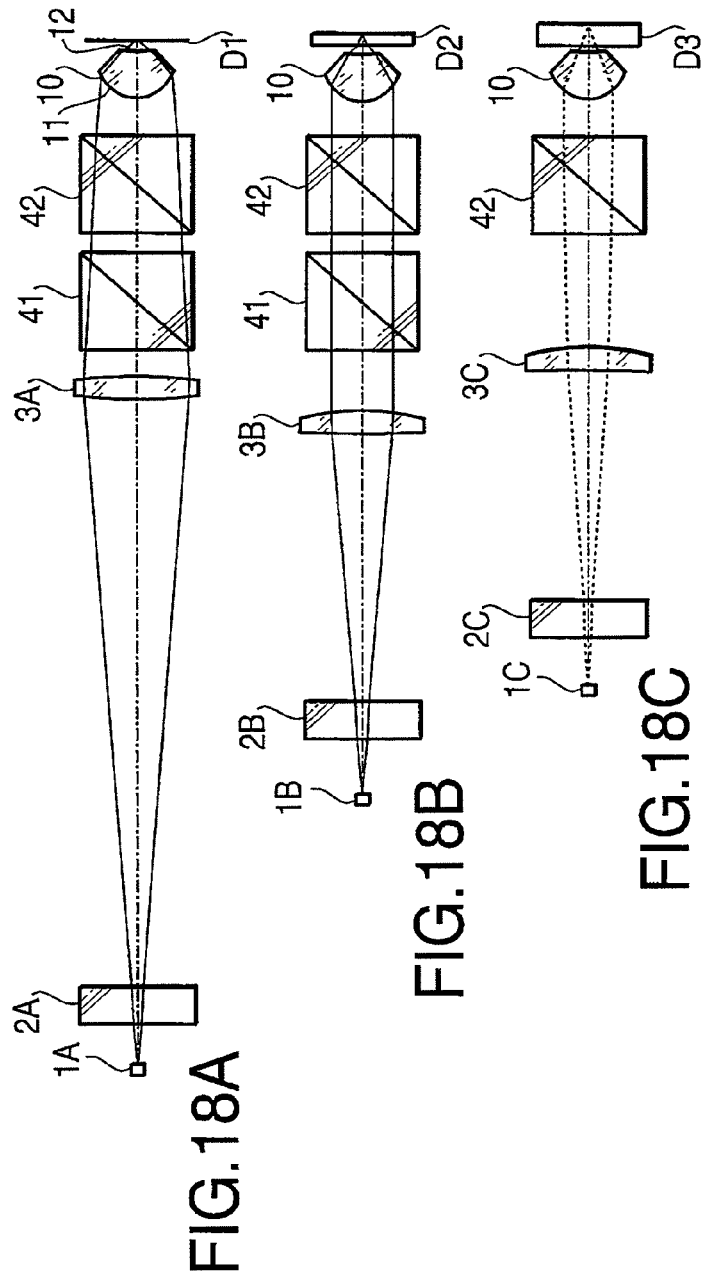
FIG. 18A
FIG. 18B
FIG. 18C

THICK LINE 6TH EMBODIMENT 0.024 $\lambda$ rms

OPTICAL PICK-UP

BACKGROUND OF THE INVENTION

The present invention relates to an optical pick-up used for recording information to and/or reproducing information from three types of optical discs of different standards including CD, DVD and a high recording density optical disc (e.g., HD DVD or BD).

An optical pick-up configured to use a common objective lens for all of a plurality of types of optical discs of different standards has become widespread. Japanese Patent Provisional Publication No. HEI 9-306024 (hereafter, referred to as JP HEI 9-306024A) discloses an optical pick-up employing a common objective lens used for CD and DVD. The optical pick-up disclosed in JP HEI 9-306024A is configured to change magnification of the objective lens in accordance with the type of the optical disc being used to suppress aberrations caused by temperature variations. More specifically, in the optical pick-up, a converging light beam is incident on the objective lens when DVD is used, while a substantially collimated beam is incident on the objective lens when the CD is used.

Japanese Patent Provisional Publication No. 2004-247025 (hereafter, referred to as JP 2004-247025A) discloses an optical information recording/reproducing device for recording information to and/or reproducing information from a plurality of types of optical discs, such as CD, DVD and an optical disc which achieves a recording density higher than that of DVD through use of blue laser. In JP 2004-247025A, two types of optical systems are disclosed. A first optical system (disclosed in the $1^{st}$ and $2^{nd}$ embodiments in JP 2004-247025A) forms an infinite optical system for each of the plurality of types of optical discs. That is, in the first optical system, a collimated beam is incident on an objective lens for each of the plurality of types of optical discs. A second optical system (disclosed in the $3^{rd}$ embodiment in JP 2004-247025A) forms a finite optical system for each of the plurality of types of optical discs. In the second optical system a diverging beam is incident on the objective lens for each of the plurality of types of the objective lenses.

In each of the first and second optical systems, the objective lens is provided with a diffraction structure designed to achieve the desired diffraction efficiency through use of different orders of diffraction light for light beams having different wavelengths while securing the desired light amount. Regarding the infinite optical system, an optical element having an optical correction structure for temperature compensation or chromatic aberration compensation is placed on an optical path. Regarding the finite optical system, a diffraction structure is formed on a coupling lens in addition to forming a diffraction structure on the objective lens because the tracking performance of the finite optical system is inferior to that of the infinite optical system and the temperature characteristic of the finite optical system may deteriorate particularly when a diverging beam is incident on the objective lens.

SUMMARY OF THE INVENTION

However, the optical pick-up disclosed in JP HEI 9-306024A is configured to achieve information recording or information reproducing only for the two types of optical discs (i.e., DVD and CD), and is not configured to achieve the information recording or information reproducing for three types of optical discs including an optical disc (e.g., HD DVD) having a higher recording density than DVD.

Although the optical pick-up disclosed in JP 2004-247025A is able to achieve information recording or information reproducing for an optical disc having a higher recording density than DVD, the optical pick-up needs to employ a dedicated optical element for correction of aberrations or to form a diffraction structure on the coupling lens, in addition to forming a diffraction structure on the objective lens. Such a configuration increases the number of components in the optical pick-up.

The present invention is advantageous in that it provides an optical pick-up capable of recording information to and/or reproducing information from a plurality of types of optical discs including a CD, a DVD and an optical disc having a higher recording density than DVD, without increasing the number of components and expense of a coupling lens, while suppressing aberrations due to temperature variations.

According to an aspect of the invention, there is provided an optical pick-up used for recording information to and/or reproducing information from at least three types of optical discs, by selectively using one of three types of light beams including a first light beam having a shortest wavelength of $\lambda_1$, a second light beam having a wavelength of $\lambda_2$ longer than the wavelength of the first light beam and a third light beam having a longest wavelength of $\lambda_3$. The at least three types of optical discs includes a first optical disc having a highest recording density, a second optical disc having a recording density lower than that of the first optical disc, and a third optical disc having a lowest recording density. When protective layer thicknesses of the first, second and third optical discs are represented by t1, t2 and t3, respectively, the protective layer thicknesses satisfying a condition of $t1 \leq t2 < t3$. The optical pick-up includes a first light source that emits the first light beam when the first optical disc is used, a second light source that emits the second light beam when the second optical disc is used, a third light source that emits the third light beam when the third optical disc is used, a first coupling lens, and an objective lens formed to converge each of the first, second and third light beams onto the first, second and third optical discs, respectively.

In this configuration, the objective lens has a step structure including a plurality of concentrically formed refractive surface zones divided by steps, the step structure having a function of giving, at each step, an optical path length difference of approximately $2\lambda_1$ to the first light beam. The first coupling lens causes the first light beam to be incident on the objective lens as a converging beam. If f1 and M1 respectively represent a focal length and magnification of the objective lens defined when the first optical disc is used, and f2 and M2 respectively represent a focal length and magnification of the objective lens defined when the second optical disc is used, the objective lens is positioned to satisfy a condition (1):

$$-0.35 < f2 \times M2 - f1 \times M1 < -0.07 \tag{1}$$

With this configuration, it is possible to achieve a high use efficiency of light for each of the first, second and third light beams. Such a configuration makes it possible to use the second order diffraction light for the first light beam and the first order diffraction light for each of the second and third light beams. Therefore, by appropriately setting the magnification for each of the first to third optical discs, the spherical aberration can be suppressed for each of the first to third light beams. In particular, by causing a converging beam to enter the objective lens when the first optical disc having the highest recording density is used, it is possible to suppress the spherical aberration due to temperature variations to a low level. Consequently, it is possible to provide an optical pick-up capable of recording information to and/or reproducing information from a plurality of types of optical discs including a CD, a DVD and an optical disc having a higher recording density than DVD, without increasing the number of components and expense of a coupling lens, while suppressing aberrations due to temperature variations.

In at least one aspect, when numerical apertures required for information reproducing or information recording on the first, second and third optical discs are defined as NA1, NA2 and NA3, respectively, the numerical apertures satisfy following relationships: (NA1>NA3); and (NA2>NA3). In this case, the objective lens has a first region for securing the numerical aperture NA3. In the first region, the step structure provides the function of giving, at each step, the optical path length difference of approximately $2\lambda_1$ to the first light beam.

In at least one aspect, each of the protective layer thicknesses t1 and t2 of the first and second optical discs is approximately 0.6 mm, and the protective layer thickness t3 of the third optical disc is approximately 1.2 mm. The objective lens is positioned to satisfy a condition:

$$-0.25 < f2 \times M2 - f1 \times M1 < -0.07 \quad (2).$$

In at least one aspect, the objective lens is positioned to satisfy a condition:

$$0.05 < f1 \times M1 < 0.25 \quad (3).$$

In at least one aspect, the objective lens is positioned to satisfy a condition:

$$-0.02 < f2 \times M2 < 0.02 \quad (4).$$

In at least one aspect, if f3 and M3 respectively represent a focal length and magnification of the objective lens defined when the third optical disc is used, the objective lens is positioned to satisfy a condition:

$$-0.26 < f3 \times M3 - f1 \times M1 < -0.15 \quad (5).$$

In at least one aspect, the protective layer thicknesses t1, t2 and t3 of the first to third optical discs satisfy conditions: $t3-t1 \geq 1.0$ mm; and $t2 \approx 0.6$ mm. In this case, the objective lens is positioned to satisfy a condition:

$$-0.35 < f2 \times M2 - f1 \times M1 < -0.17 \quad (6).$$

In at least one aspect, the objective lens is positioned to satisfy a condition:

$$0.10 < f1 \times M1 < 0.35 \quad (7).$$

In at least one aspect, the objective lens is positioned to satisfy a condition:

$$-0.02 < f2 \times M2 < 0.02 \quad (4).$$

In at least one aspect, the objective lens is positioned to satisfy a condition:

$$-0.31 < f3 \times M3 - f1 \times M1 < -0.20 \quad (8).$$

In at least one aspect, the objective lens has a second region formed outside the first region. The second region is configured to converge the first and second light beams onto the first and second optical discs, respectively, and not to contribute to convergence of the third light beam. The sep structure in the second region includes a step which gives an optical path length difference approximately equal to $2\lambda_1$ or $-2\lambda_1$ to the first light beam and a step which gives an optical path length difference approximately equal to $5\lambda_1$ or $-5\lambda_1$ to the first light beam.

In at least one aspect, an effective beam diameter of the first light beam defined when the first light beam is incident on the objective lens is larger than an effective beam diameter of the second light beam defined when the second light beam is incident on the objective lens. The objective lens has a third region formed outside the second region. The third region is configured to converge only the first light beam onto the first optical disc, and not to contribute to convergence of the second and third light beams. The step structure in the third region gives, to the first light beam, an optical path length difference which is different from an optical path length difference given to the first light beam by the step structure in the second region.

In at least one aspect, the step structure in the third region includes a step which gives an optical path length difference approximately equal to $\lambda_1$ or $-\lambda_1$ to the first light beam.

In at least one aspect, an effective beam diameter of the first light beam defined when the first light beam is incident on the objective lens is smaller than an effective beam diameter of the second light beam defined when the second light beam is incident on the objective lens. The objective lens has a third region formed outside the second region. The third region is configured to converge only the second light beam onto the second optical disc, and not to contribute to convergence of the first and third light beams. The step structure in the third region gives, to the second light beam, an optical path length difference which is different from an optical path length difference given to the second light beam by the step structure in the second region.

In at least one aspect, the step structure in the third region includes a step which gives an optical path length difference approximately equal to $\lambda_2$ or $-\lambda_2$ to the second light beam.

In at least one aspect, the optical pick-up further includes at least one second coupling lens which causes the second and third light beams to be incident on the objective lens in first and second predetermined states, respectively.

According to another aspect of the invention, there is provided an optical pick-up used for recording information to and/or reproducing information from at least three types of optical discs, by selectively using one of three types of light beams including a first light beam having a shortest wavelength of $\lambda_1$, a second light beam having a wavelength of $\lambda_2$ longer than the wavelength of the first light beam and a third light beam having a longest wavelength of $\lambda_3$. The at least three types of optical discs including a first optical disc having a highest recording density, a second optical disc having a recording density lower than that of the first optical disc, and a third optical disc having a lowest recording density. When protective layer thicknesses of the first, second and third optical discs are represented by t1, t2 and t3, respectively, the protective layer thicknesses satisfy a condition of $t1 \leq t2 < t3$. When numerical apertures required for information reproducing or information recording on the first, second and third optical discs are defined as NA1, NA2 and NA3, respectively, the numerical apertures satisfy following relationships: (NA1>NA3); and (NA2>NA3). The optical pick-up includes a first light source that emits the first light beam when the first optical disc is used, a second light source that emits the second light beam when the second optical disc is used, a third light source that emits the third light beam when the third optical disc is used, a first coupling lens, and an objective lens formed to converge each of the first, second and third light beams onto the first, second and third optical discs, respectively.

In this configuration, the objective lens has a step structure including a plurality of concentrically formed refractive surface zones divided by steps. The first coupling lens causes the first light beam to be incident on the objective lens as a converging beam. The objective lens has a first region for securing the numerical aperture NA3. In the first region, the step structure gives, at each step, an optical path length difference of approximately $2\lambda_1$ to the first light beam.

With this configuration, it is possible to achieve a high use efficiency of light for each of the first, second and third light beams. Such a configuration makes it possible to user the second order diffraction light for the first light beam and the first order diffraction light for each of the second and third light beams. Therefore, by appropriately setting the magnification for each of the first to third optical discs, the spherical aberration can be suppressed for each of the first to third light beams. In particular, by causing a converging beam to enter the objective lens when the first optical disc having the highest recording density is used, it is possible to suppress the spherical aberration due to temperature variations to a low level. Consequently, it is possible to provide an optical pick-up capable of recording information to and/or reproducing information from a plurality of types of optical discs including a CD, a DVD and an optical disc having a higher recording density than DVD, without increasing the number of components and expense of a coupling lens, while suppressing aberrations due to temperature variations.

BRIEF DESCRIPTION OF THE ACCOMPANYING DRAWINGS

FIG. 4 is a graph illustrating, for each of the first embodiment and a first comparative example of an optical pick-up, the wavefront aberration caused when the temperature changes by +30 degrees.

FIG. 5A illustrates a developed block diagram defined in the optical pick-up according to a second embodiment when the first optical disc is used, FIG. 5B illustrates a developed block diagram defined in the optical pick-up according to the second embodiment when the second optical disc is used, and FIG. 5C illustrates a developed block diagram defined in the optical pick-up according to the second embodiment when the third optical disc is used.

FIGS. 6A-6C show spherical aberration caused in the optical pick-up according to the second embodiment.

FIG. 7 is a graph illustrating, for each of the second embodiment and the first comparative example of an optical pick-up, the wavefront aberration caused when the temperature changes by +30 degrees.

FIG. 8A illustrates a developed block diagram defined in the optical pick-up according to a third embodiment when the first optical disc is used, FIG. 8B illustrates a developed block diagram defined in the optical pick-up according to the third embodiment when the second optical disc is used, and FIG. 8C illustrates a developed block diagram defined in the optical pick-up according to the third embodiment when the third optical disc is used.

FIGS. 9A-9C show the spherical aberration caused in the optical pick-up according to the third embodiment.

Figure 10:
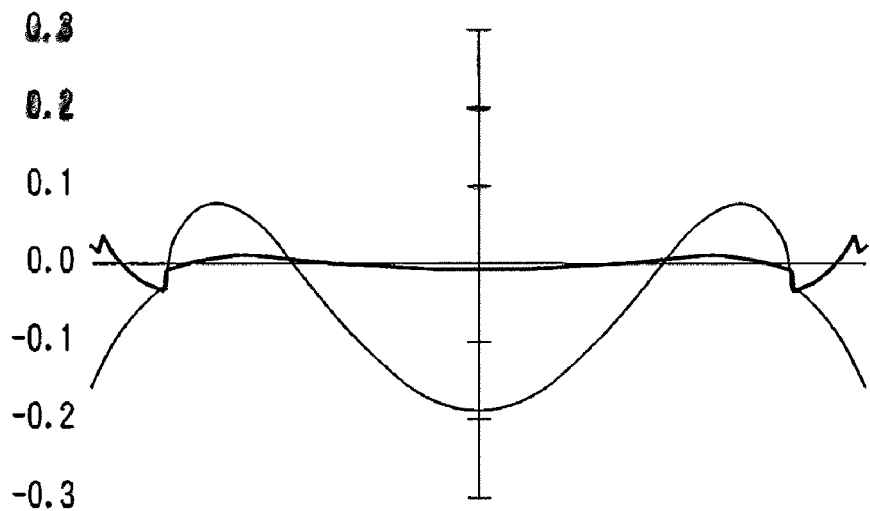

FIG. 10 is a graph illustrating, for each of the third embodiment and a second comparative example of an optical pick-up, the wavefront aberration caused when the temperature changes by +30 degrees.

Figure 11:
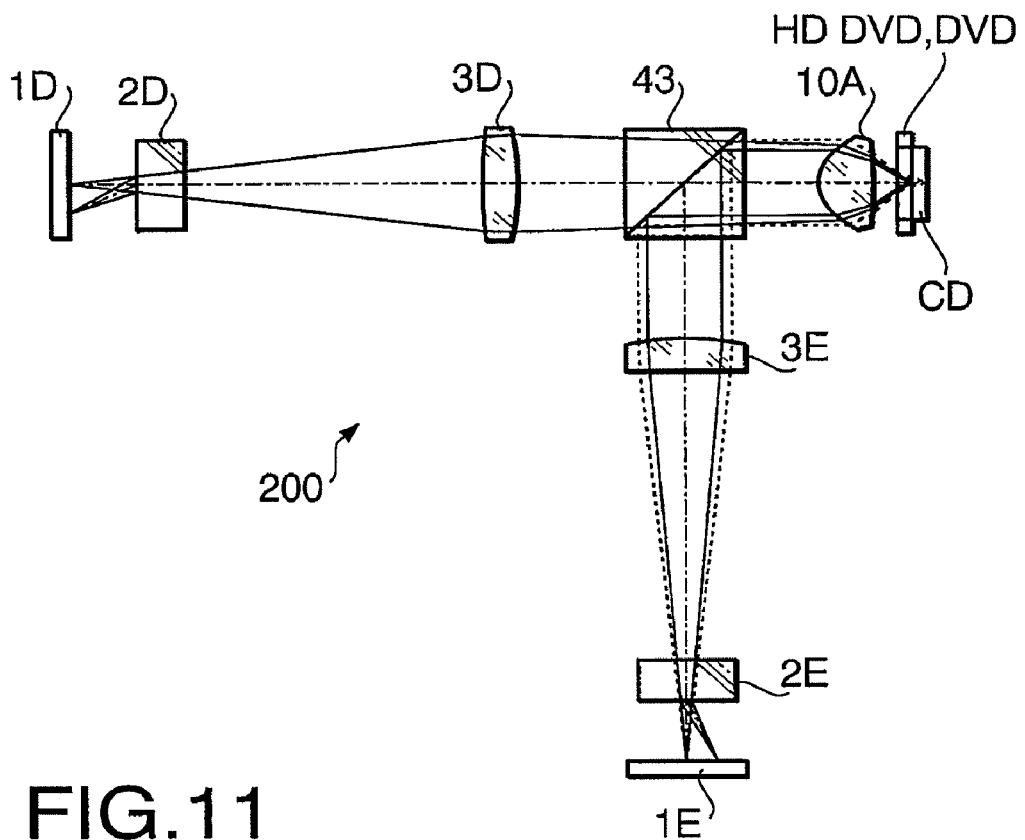

FIG. 11 is an optical block diagram of an optical pick-up according to a fourth embodiment.

FIG. 12A illustrates a developed block diagram defined in the optical pick-up according to the fourth embodiment when the first optical disc is used, FIG. 12B illustrates a developed block diagram defined in the optical pick-up according to the fourth embodiment when the second optical disc is used, and FIG. 12C illustrates a developed block diagram defined in the optical pick-up according to the fourth embodiment when the third optical disc is used.

FIGS. 13A-13C show the spherical aberration caused in the optical pick-up according to the fourth embodiment.

FIG. 14 is a graph illustrating, for each of the fourth embodiment and the first comparative example of an optical pick-up, the wavefront aberration caused when the temperature changes by +30 degrees.

FIG. 15A illustrates a developed block diagram defined in the optical pick-up according to a fifth embodiment when the first optical disc is used, FIG. 15B illustrates a developed block diagram defined in the optical pick-up according to the fifth embodiment when the second optical disc is used, and FIG. 15C illustrates a developed block diagram defined in the optical pick-up according to the fifth embodiment when the third optical disc is used.

FIGS. 16A-16C show the spherical aberration caused in the optical pick-up according to the fifth embodiment.

FIG. 17 is a graph illustrating the wavefront aberration caused in the fifth embodiment when the temperature changes by +30 degrees.

FIG. 18A illustrates a developed block diagram defined in the optical pick-up according to a sixth embodiment when the first optical disc is used, FIG. 18B illustrates a developed block diagram defined in the optical pick-up according to the sixth embodiment when the second optical disc is used, and FIG. 18C illustrates a developed block diagram defined in the optical pick-up according to the sixth embodiment when the third optical disc is used.

Figure 19C:
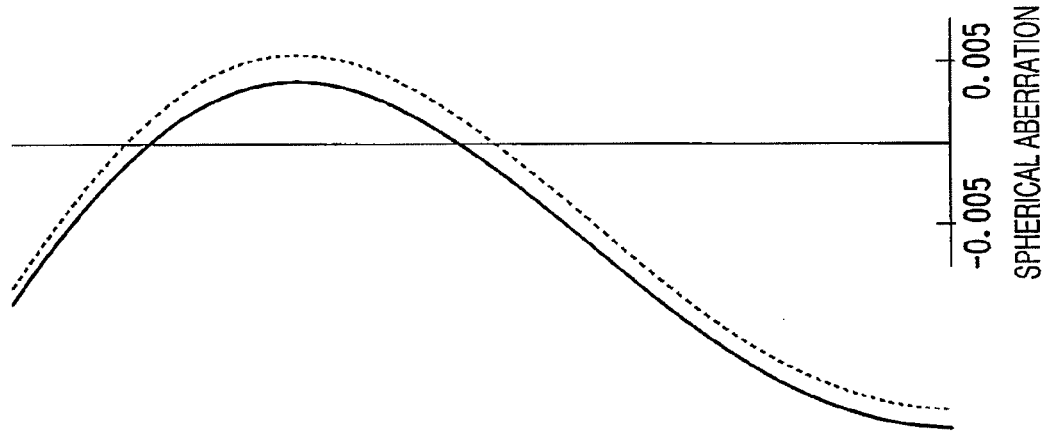
Figure 19B:
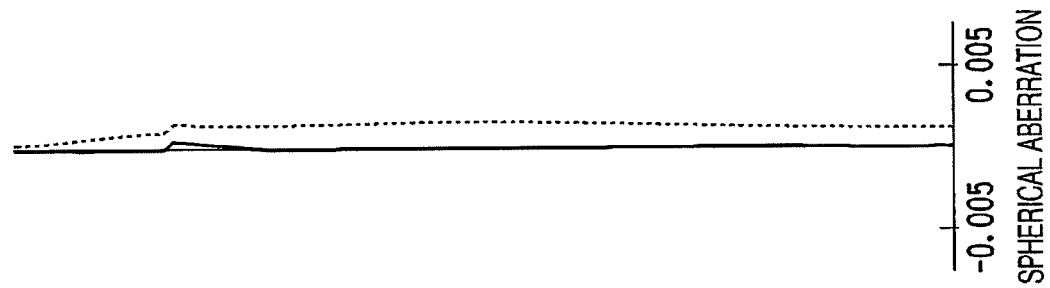
Figure 19A:
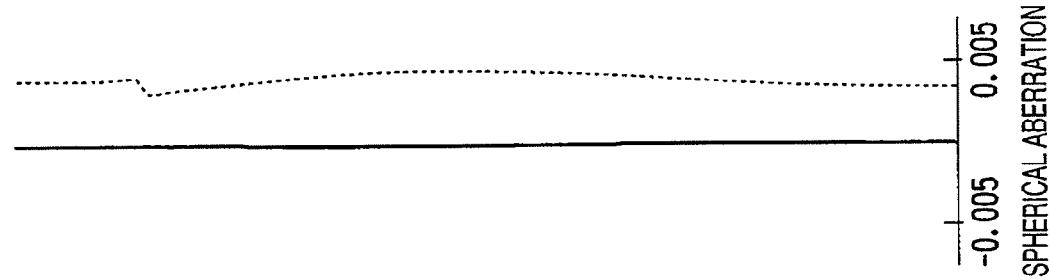

FIGS. 19A-19C show the spherical aberration caused in the optical pick-up according to the sixth embodiment.

Figure 20:
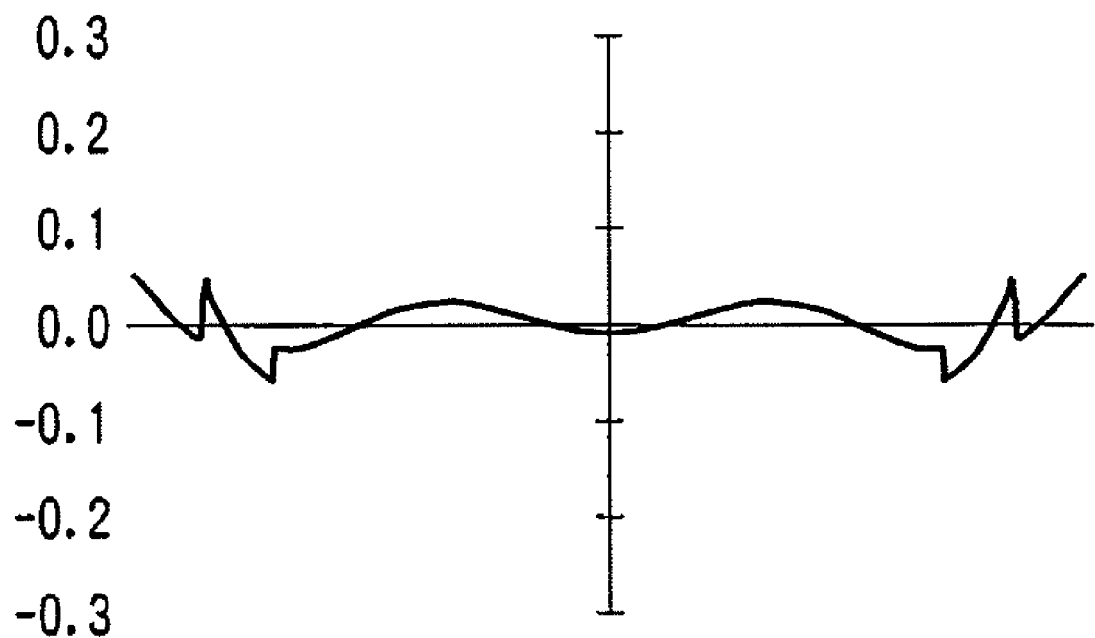

FIG. 20 is a graph illustrating the wavefront aberration caused in the sixth embodiment when the temperature changes by +30 degrees.

Figure 21:
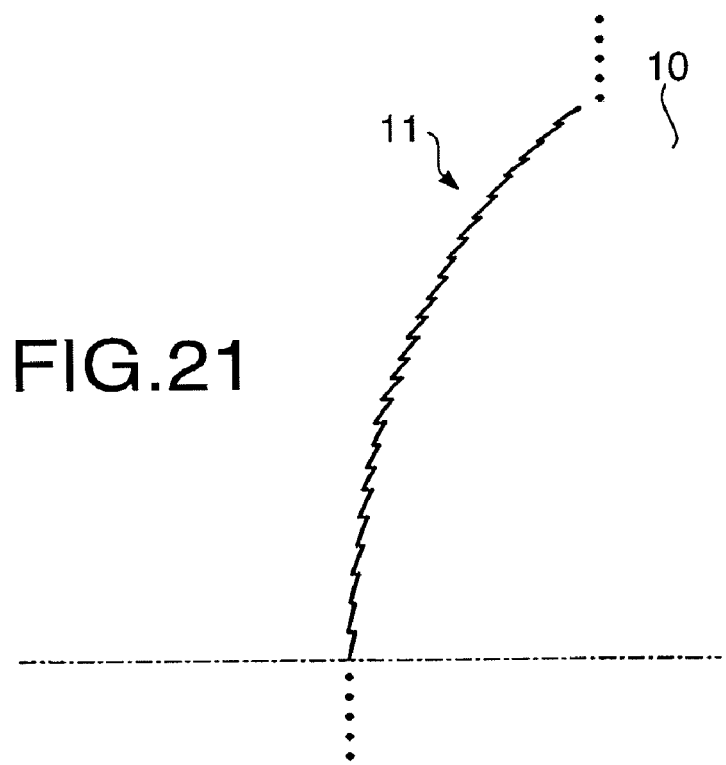

FIG. 21 is a conceptual illustration of a diffraction lens structure formed on a lens surface of an objective lens.

Figure 22:
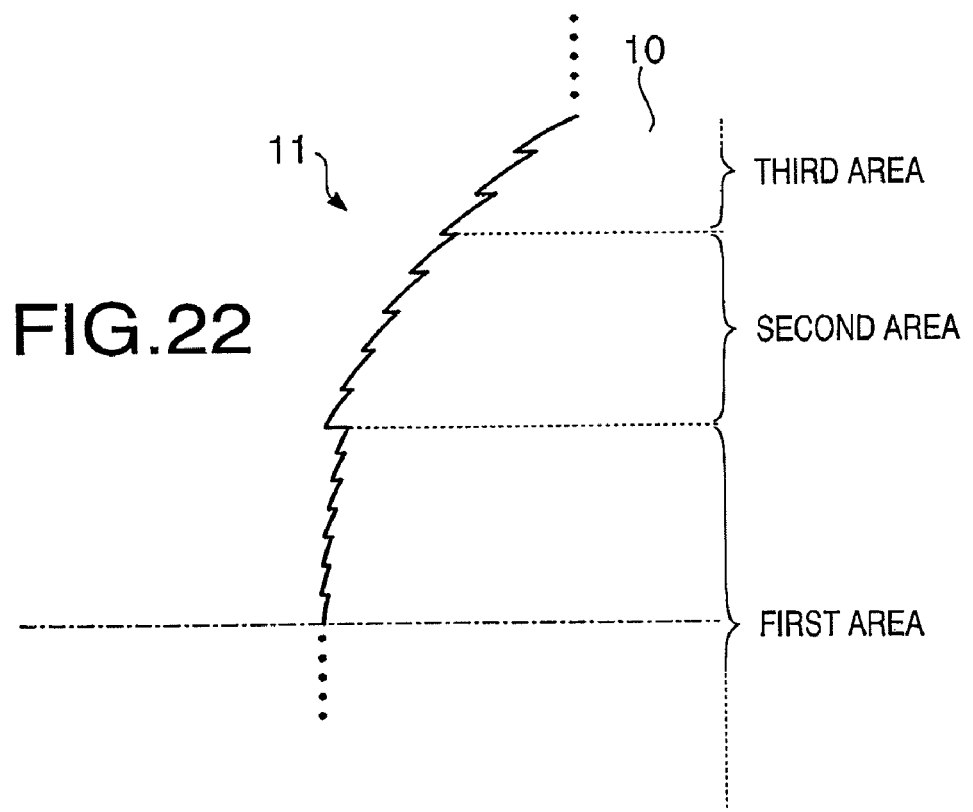

FIG. 22 is a conceptual illustration of the lens surface of the objective lens including a first to third areas.

DETAILED DESCRIPTION OF THE EMBODIMENTS

Hereinafter, embodiments according to the invention are described with reference to the accompanying drawings.

First Embodiment

Hereafter, an optical pick-up according to a first embodiment is explained. The optical pick-up is used for recording information to and/or reproducing information from a plurality of types of optical discs including a first optical disc (e.g., HD DVD) having the highest recording density and having the protective layer thickness of 0.6 mm, a second optical disc (e.g., DVD) having the second highest recording density and having the protective layer thickness of 0.6 mm and a third optical disc (e.g., CD) having the lowest recording density and having the protective layer thickness of 1.2 mm.

In the following, the term "compatibility" means that the optical pick-up ensures the information reproducing and/or information recording with no need of component replacement even when the optical disc being used is switched.

Figure 1:
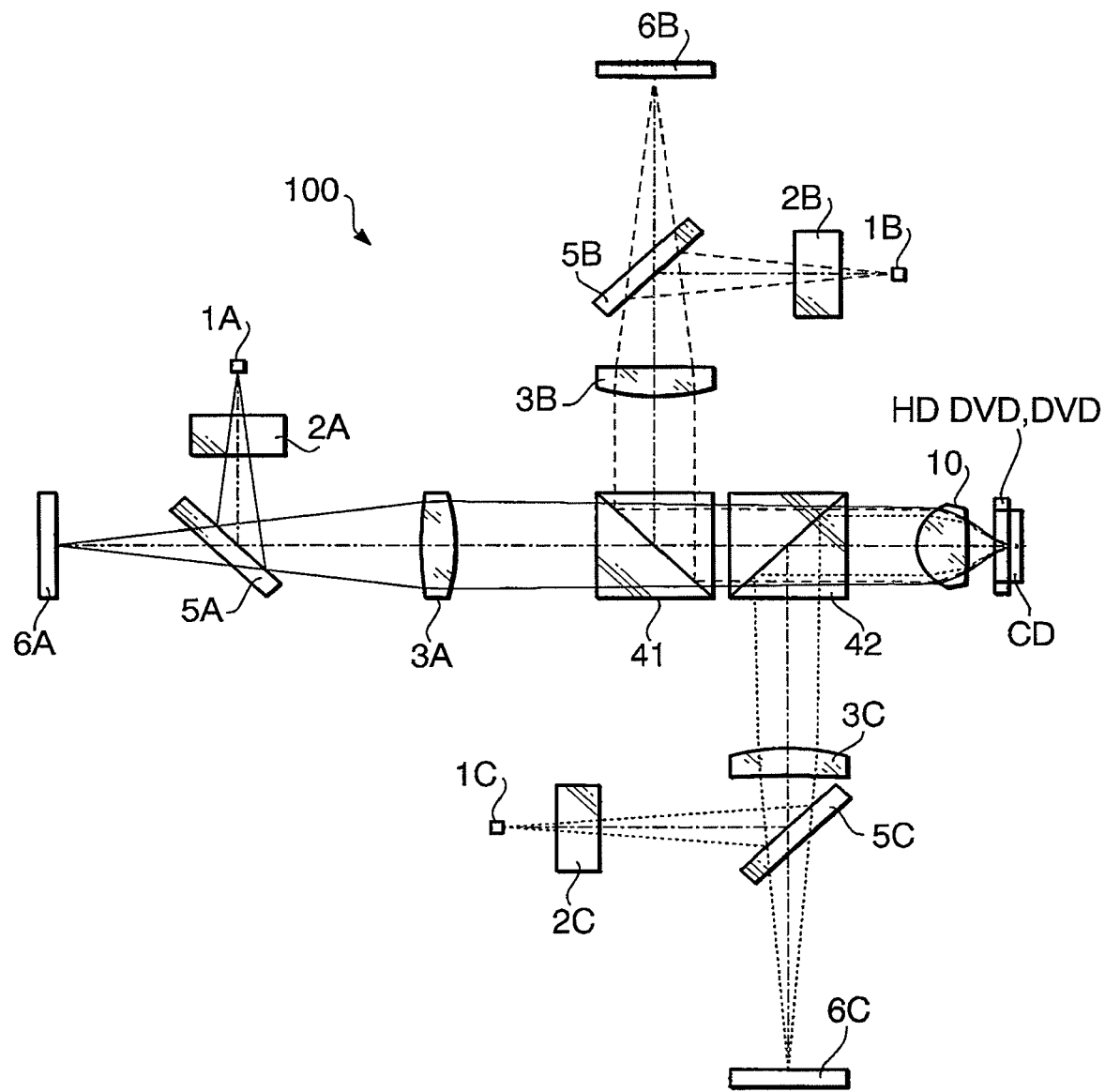
FIG. 1 is an exemplary example of a block diagram of an optical system in an optical pick-up according to a first embodiment.
Figure 2A:
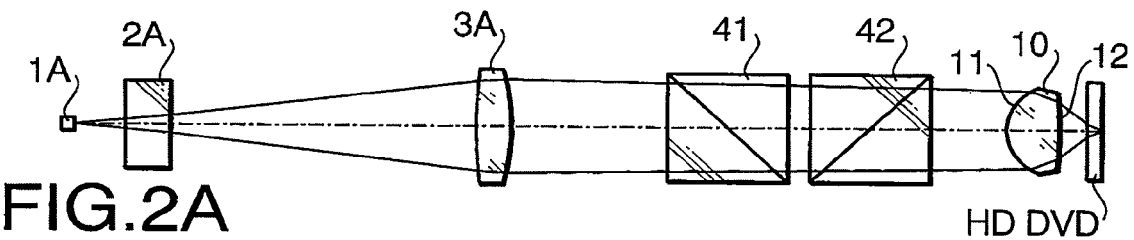
FIG. 2A illustrates a developed block diagram defined in the optical pick-up when a first optical disc is used.
Figure 2B:
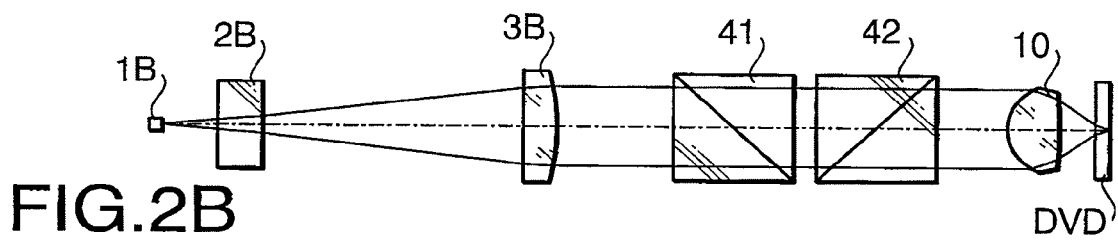
FIG. 2B illustrates a developed block diagram defined in the optical pick-up when a second optical disc is used.
Figure 2C:
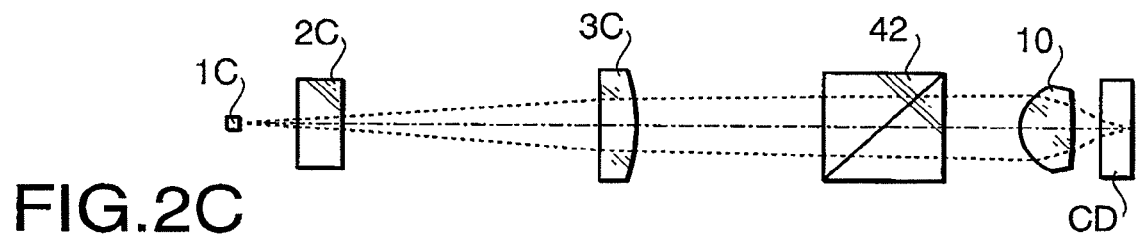
FIG. 2C illustrates a developed block diagram defined in the optical pick-up when a third optical disc is used.

FIG. 1 is an exemplary example of a block diagram of an optical system in an optical pick-up 100 according to the first embodiment. FIG. 2A illustrates a developed block diagram defined in the optical pick-up 100 shown in FIG. 1 when the first optical disc is used, FIG. 2B illustrates a developed block diagram defined in the optical pick-up 100 shown in FIG. 1 when the second optical disc is used, and FIG. 2C illustrates a developed block diagram defined in the optical pick-up 100 shown in FIG. 1 when the third optical disc is used.

As shown in FIGS. 1 and 2A-2C, the optical pick-up 100 includes a light source 1A which emits a first laser beam having the shortest wavelength (e.g., 405 nm) when the first optical disc is used, a light source 1B which emits a second laser beam having the second shortest wavelength (e.g., 660 nm) when the second optical disc is used, and a light source 1C which emits a third laser beam (e.g., 790 nm) having the longest wavelength when the third optical disc is used.

When the first optical disc is used, the first laser beam emitted by the light source 1A passes through a diffraction grating 2A and is reflected by a half mirror 5A toward a coupling lens 3A. Each of the diffraction gratings 2A, 2B and 2C has a function of forming a sub-beam used for tracking servo control. Then, the first laser beam is converted into a converging beam by the coupling lens 3A, and then passes through beam splitters 41 and 42. The first laser beam emerging from the beam splitter 42 is then converged by an objective lens 10 to form a beam spot on a record surface of the first optical disc.

The first laser beam returning from the first optical disc passes along the same optical path defined from the half mirror 5A to the first optical disc, and impinges on a detector 6A after passing through the half mirror 5A. Each of the detectors 6A, 6B and 6C has a plurality of light-receptive areas for generating a reproduction signal, a tracking error signal and a focusing error signal.

When the second optical disc is used, the second laser beam emitted by the light source 1B passes through a diffraction grating 2B and is reflected by a half mirror 5B toward a coupling lens 3B. Then, the second laser beam is converted into a collimated beam by the coupling lens 3B, is reflected by the beam splitter 41, and then passes through the beam splitter 42. The second laser beam emerging from the beam splitter 42 is then converged by the objective lens 10 to form a beam spot on a record surface of the second optical disc. The second laser beam returning from the second optical disc passes along the same optical path defined from the half mirror 5B to the second optical disc, and impinges on the detector 6B after passing through the half mirror 5B.

When the third optical disc is used, the third laser beam emitted by the light source 1C passes through a diffraction grating 2C and is reflected by a half mirror 5C toward a coupling lens 3C. Then, the third laser beam is converted into a slightly diverging beam by the coupling lens 3C, and then passes through beam splitter 42. The third laser beam emerging from the beam splitter 42 is then converged by the objective lens 10 to form a beam spot on a record surface of the third optical disc. The third laser beam returning from the third optical disc passes along the same optical path defined from the half mirror 5C to the third optical disc, and impinges on the detector 6C after passing through the half mirror 5C.

As shown in FIG. 2A, the objective lens 10 has a lens surface 11 located on the light source side and a lens surface 12 located on the optical disc side. The objective lens 10 is a biconvex single-element lens. Each of the lens surfaces 11 and 12 of the objective lens 10 is an aspherical surface. The objective lens 10 is used for each of the first to third optical discs. That is, the objective lens 10 is a common objective lens. On the lens surface 11 of the objective lens 10, a diffraction lens structure is formed. The diffraction lens structure includes a plurality of annular refractive surface zones which are concentrically formed about a predetermined axis (e.g., an optical axis of the objective lens 10). Between adjacent ones of the annular refractive surface zones, a step is formed to give an optical path length difference between adjacent ones of the refractive surface zones. The diffraction lens structure means a structure achieving a diffraction function through a step equivalent to a wavelength of a beam being used. FIG. 21 is a conceptual illustration of the diffraction lens structure formed on the lens surface 11 of the objective lens 10.

The optical pick-up 100 includes a tracking mechanism (not shown) for controlling a beam spot formed on the optical disc to trace a track on the optical disc. The objective lens 10 is mounted on the tracking mechanism.

When NA1 represents a numerical aperture required for information recording or information reproducing for the first optical disc, NA2 represents a numerical aperture required for information recording or information reproducing for the second optical disc, and NA3 represents a numerical aperture required for information recording or information reproducing for the third optical disc, the numerical apertures satisfy the following conditions:

NA1>NA3; and

NA2>NA3.

In this embodiment, NA1=0.65, NA2=0.60 and NA3=0.48.

The diffraction lens structure is formed such that each step gives an optical path length difference approximately equal to $2\lambda_1$ ($\lambda_1$: the wavelength of the first laser beam). Regarding the case where the first to third laser beams have wavelengths of 405 nm, 660 nm and 790 nm, respectively, the second order diffraction light is used for the first laser beam, the first order diffraction light is used for each of the second and third laser beams. With this configuration, it is possible to use each laser beam at a high degree of efficiency.

When the diffraction lens structure is designed to achieve a diffraction efficiency of 100% for the first, second, third, fourth, fifth or sixth order of diffraction light of the first laser beam, the diffraction orders and the use efficiencies of light of the second and third laser beams take values shown in the following Table 1.

TABLE 1

| (material of the objective lens: nd = 1.509, vd = 56.4 at the blazed wavelength of 405 nm) | | | | | |
|---|---|---|---|---|---|
| $\lambda$ = 405 nm | | $\lambda$ = 660 nm | | $\lambda$ = 790 nm | |
| Diffraction Order | Diffraction Efficiency | Diffraction Order | Diffraction Efficiency | Diffraction Order | Diffraction Efficiency |
| $1^{st}$ Order | 100% | $1^{st}$ Order | 56% | 0-th/$1^{st}$ Order | 42%/39% |
| $2^{nd}$ Order | 100% | $1^{st}$ Order | 89% | $1^{st}$ Order | 100% |
| $3^{rd}$ Order | 100% | $2^{nd}$ Order | 85% | $1^{st}$/$2^{nd}$ Order | 44%/37% |

TABLE 1-continued (material of the objective lens: nd = 1.509, vd = 56.4 at the blazed wavelength of 405 nm)

| $\lambda$ = 405 nm | | $\lambda$ = 660 nm | | $\lambda$ = 790 nm | |
|---|---|---|---|---|---|
| Diffraction Order | Diffraction Efficiency | Diffraction Order | Diffraction Efficiency | Diffraction Order | Diffraction Efficiency |
| $4^{th}$ Order | 100% | $3^{rd}$ Order | 100% | $2^{nd}/3^{rd}$ Order | 47%/34% |
| $5^{th}$ Order | 100% | $3^{rd}/4^{th}$ Order | 32%/49% | $3^{rd}$ Order | 99% |

As can be seen from Table 1, when the second order diffraction light is used for the first laser beam, the diffraction efficiency is maximized for each of the second and third laser beams. For this reason, in this embodiment, the diffraction lens structure is designed to use the second diffraction light for the first laser beam.

If the magnification defined when the first optical disc (e.g., HD DVD) is used and the magnification defined when the second optical disc (e.g., DVD) is used are equal to each other, the amount of the spherical aberration due to temperature variations is increased by the effect of the diffraction lens structure formed to achieve the compatibility with the first and second optical discs. Therefore, the optical pick-up 100 is designed to appropriately set a difference between the magnification for the first optical disc and the magnification for the second optical disc so that the amount of the spherical aberration due to temperature variations can be decreased, while placing emphasize upon achieving the suitable diffraction efficiencies for the first to third laser beams by using the second order diffraction light for the first laser beam.

More specifically, if f1 and M1 respectively represent a focal length and the magnification of the objective lens 10 defined when the first optical disc is used, f2 and M2 respectively represent a focal length and the magnification of the objective lens 10 defined when the second optical disc is used, and f3 and M3 respectively represent a focal length and the magnification of the objective lens 10 defined when the third optical disc is used, the optical pick up 100 is configured such that the objective lens 10 is positioned to satisfy the following conditions (1) to (5).

$$-0.35 < f2 \times M2 - f1 \times M1 < -0.07 \quad (1)$$

$$-0.25 < f2 \times M2 - f1 \times M1 < -0.07 \quad (2)$$

$$0.05 < f1 \times M1 < 0.25 \quad (3)$$

$$-0.02 < f2 \times M2 < 0.02 \quad (4)$$

$$-0.26 < f3 \times M3 - f1 \times M1 < -0.15 \quad (5)$$

By the effect of the diffraction lens structure and by satisfying the conditions (1) to (5), the optical pick-up 100 is able to correct the spherical aberration caused by the difference between the protective layer thicknesses of the optical discs and the difference between the wavelengths of the laser beams while suppressing the spherical aberration due to temperature variations to a low level.

The condition (1) defines the difference between the magnification for the first optical disc and the magnification for the second optical disc. By setting the magnification for the first optical disc to have a value larger than the magnification for the second optical disc, it is possible to suppress the spherical aberration for both of the first and second optical discs while also suppressing the amount of spherical aberration due to temperature variations to a low level. If (f2×M2−f1×M1) gets larger than the upper limit of the condition (1), the amount of the spherical aberration due to temperature variations becomes too large. If (f2×M2−f1×M1) gets smaller than the lower limit of the condition (1), the relative amount of coma caused by an obliquely incident beam when the first and second optical discs are used becomes too large. If a HD-DVD disc is used as the first optical disc, the lower limit of the condition (1) is preferably limited to the value defined in the condition (2).

The condition (3) defines the magnification for the first optical disc. The condition (3) provides a suitable condition of the magnification defined when a HD-DVD is used as the first optical disc. By causing a converging beam satisfying the condition (3) to be incident on the objective lens 10, it is possible to suppress the amount of the spherical aberration due to temperature variations while decreasing the absolute value of the magnification for the third optical disc (e.g., CD). Therefore, it is possible to maintain the tracking performance at a suitable level. If f1×M1 gets larger than the upper limit of the condition (3), the degree of convergence of the first laser beam for the first optical disc becomes too large and the amount of aberration caused during the tracking operation becomes too large when the first optical disc is used. If f1×M1 gets lower than the lower limit of the condition (3), the amount of the spherical aberration due to temperature variations becomes too large, the degree of divergence of the third laser beam for the third optical disc becomes too large, and thereby d the tracking performance deteriorates when the third optical disc is used.

The condition (4) represents that the magnification defined when the second optical disc (e.g., DVD) is used is approximately zero (i.e., an infinite optical system is provided for the second optical disc). By satisfying the condition (4), a substantially collimated beam is incident on the objective lens 10 when the second optical disc is used. Therefore, it is possible to prevent the tracking performance from deteriorating when the second optical disc is used.

The condition (5) defines a difference between the magnification for the third optical disc and the magnification for the first optical disc when a HD-DVD disc is used as the first optical disc. By satisfying the condition (5), it is possible to suitably correct the spherical aberration caused when the third optical disc is used. If (f3×M3−f1×M1) gets larger than the upper limit of the condition (5), an overcorrected spherical aberration remains. If (f3×M3−f1×M1) gets lower than the lower limit of the condition (5), an undercorrected spherical aberration occurs.

When $\lambda_1$ represents the wavelength of the first laser beam, n1 represents the refractive index of the objective lens 10 with respect to the first laser beam, $\lambda_3$ represents the wavelength of the third laser beam, n3 represents the refractive index of the objective lens 10 with respect to the third laser beam, the following condition (9) is satisfied.

$$1.95 < (\lambda_3/(n3-1))/(\lambda_1/(n1-1)) < 2.20 \quad (9)$$

Hereafter, a numeric configuration of the optical pick-up 100 according to the first embodiment is explained.

The following Table 2 shows concrete specifications of the optical pick-up 100. The optical block diagram of the optical pick-up 100 according to the first embodiment is shown in FIG. 1.

TABLE 2

|  | 1st laser beam | 2nd laser beam | 3rd laser beam |
|---|---|---|---|
| Wavelength (nm) | 405 | 660 | 790 |
| Focal Length (mm) | 3.00 | 3.11 | 3.12 |
| NA | 0.65 | 0.60 | 0.48 |
| Magnification M | 0.030 | 0.000 | −0.040 |

Table 3 shows a specific numerical configuration defined when the first optical disc is used. The developed block diagram defined when the first optical disc is used is shown in FIG. 2A. The following Table 4 shows specific numerical configuration defined when the second optical disc is used. The developed block diagram defined when the second optical disc is used is shown in FIG. 2B. The following Table 5 shows specific numerical configuration defined when the third optical disc is used. The developed block diagram defined when the third optical disc is used is shown in FIG. 2C.

TABLE 3

| Surface No. | r | d | n (405 nm) |
|---|---|---|---|
| 0 |  | 2.17 |  |
| 1 | ∞ | 2.00 | 1.52972 |
| 2 | ∞ | 13.00 |  |
| 3 | 35.050 | 1.50 | 1.52469 |
| 4 | −10.000 | 6.69 |  |
| 5 | ∞ | 5.00 | 1.52972 |
| 6 | ∞ | 1.00 |  |
| 7 | ∞ | 5.00 | 1.52972 |
| 8 | ∞ | 3.18 |  |
| 9 | 1.875 | 2.30 | 1.52469 |
| 10 | −6.540 | 1.24 |  |
| 11 | ∞ | 0.60 | 1.62231 |
| 12 | ∞ | — |  |

TABLE 4

| Surface No. | r | d | n (660 nm) |
|---|---|---|---|
| 0 |  | 2.30 |  |
| 1 | ∞ | 2.00 | 1.51374 |
| 2 | ∞ | 11.00 |  |
| 3 | 83.700 | 1.50 | 1.54044 |
| 4 | −9.250 | 5.00 |  |
| 5 | ∞ | 5.00 | 1.51374 |
| 6 | ∞ | 1.00 |  |
| 7 | ∞ | 5.00 | 1.51374 |
| 8 | ∞ | 3.00 |  |
| 9 | 1.875 | 2.30 | 1.50635 |
| 10 | −6.540 | 1.42 |  |
| 11 | ∞ | 0.60 | 1.57961 |
| 12 | ∞ | — |  |

TABLE 5

| Surface No. | r | d | n (790 nm) |
|---|---|---|---|
| 0 |  | 2.45 |  |
| 1 | ∞ | 2.00 | 1.51052 |
| 2 | ∞ | 11.00 |  |
| 3 | −61.780 | 1.50 | 1.53653 |

TABLE 5-continued

| Surface No. | r | d | n (790 nm) |
|---|---|---|---|
| 4 | −9.610 | 7.92 |  |
| 5 | ∞ | 5.00 | 1.51052 |
| 6 | ∞ | 3.26 |  |
| 7 | 1.875 | 2.30 | 1.50313 |
| 8 | −6.540 | 1.16 |  |
| 9 | ∞ | 1.20 | 1.57307 |
| 10 | ∞ | — |  |

In the Tables 3 and 4, the surface #0 represents a light source, the surfaces #1 and #2 respectively represent surfaces of the diffraction grating (2A or 2B), the surfaces #3 and #4 respectively represent surfaces of the coupling lens (3A or 3B), the surfaces #5 and #6 respectively represent surfaces of the beam splitter 41, the surfaces #7 and #8 respectively represent surfaces of the beam splitter 42, the surface #9 and #10 respectively represent the surfaces 11 and 12 of the objective lens 10, and the surfaces #11 and #12 respectively represent the protective layer and the record surface of the corresponding optical disc. In Table 5, the surface #0 represents a light source, the surfaces #1 and #2 respectively represent surfaces of the diffraction grating (2C), the surfaces #3 and #4 respectively represent surfaces of the coupling lens (3C), and the surfaces #5 and #6 respectively represent surfaces of the beam splitter 42, the surface #7 and #8 respectively represent the surfaces 11 and 12 of the objective lens 10, and the surfaces #9 and #10 respectively represent the protective layer and the record surface of the corresponding optical disc.

In Tables 3-5 (and in the following similar Tables), "r" denotes the curvature radius (mm) of each optical surface, and "d" denotes the thickness of an optical components or the distance (mm) from each optical surface to the next optical surface, and "n" represents a refractive index at the wavelength of the laser beam being used.

Each of the disc side surfaces (surface #4) of the coupling lenses 3A, 3B and 3C and the surfaces 11 and 12 of the objective lens 10 is a rotationally-symmetrical aspherical surface.

A shape of a rotationally-symmetrical aspherical surface is expressed by a following equation:

$$X(h) = \frac{ch^2}{1 + \sqrt{1 - (1+\kappa)c^2 h^2}} + A_4 h^4 + A_6 h^6 + A_8 h^8 + \ldots$$

where, X(h) represents a SAG amount which is a distance between a point on the aspherical surface at a height of h from the optical axis and a plane tangential to the aspherical surface at the optical axis, symbol c represents curvature (1/r) on the optical axis, $\kappa$ is a conical coefficient, and $A_2 h^4$, $A_6 h^6$, $A_8 h^8$ . . . represent aspherical coefficients of even orders.

The following Table 6 shows the cone constants K and aspherical coefficients specifying the shape of each of the disc side surface (surface #4) of the coupling lens 3A and the surfaces 11 and 12 of the objective lens 10. The following Table 7 shows the cone constant $\kappa$ and aspherical coefficients specifying the shape of the disc side surface (surface #4) of the coupling lens 3B. The following Table 8 shows the cone constant $\kappa$ and aspherical coefficients specifying the shape of the disc side surface (surface #4) of the coupling lens 3C. In Tables 6-8 (and in the following similar Tables), the notation "E" means the power of 10 with an exponent specified by the number to the right of E (e.g. "E-04" means "×$10^{-4}$").

TABLE 6

| Surface No. | κ | A4 | A6 | A8 | A10 | A12 |
|---|---|---|---|---|---|---|
| 4 | 0.0000 | 1.4070E−04 | 9.0000E−07 | 4.4100E−09 | 0.0000E+00 | 0.0000E+00 |
| 9 | −0.6000 | 1.6360E−03 | 5.2510E−04 | −1.9130E−04 | 8.2370E−05 | −1.2950E−05 |
| 10 | 0.0000 | 3.1330E−02 | −1.0890E−02 | 3.5830E−03 | −9.9670E−04 | 1.2840E−04 |

TABLE 7

| Surface No. | κ | A4 | A6 | A8 | A10 | A12 |
|---|---|---|---|---|---|---|
| 4 | 0.0000 | 1.1350E−04 | 1.0100E−06 | 7.4600E−09 | 0.0000E+00 | 0.0000E+00 |

TABLE 8

| Surface No. | κ | A4 | A6 | A8 | A10 | A12 |
|---|---|---|---|---|---|---|
| 4 | 0.0000 | 4.0940E−05 | 4.0900E−07 | 3.5600E−09 | 0.0000E+00 | 0.0000E+00 |

On the surface 11 of the objective lens 10, the diffraction lens structure is formed. An additional optical path length of the diffraction lens structure can be formed by an optical path difference function $\phi(h)$:

$$\phi(h)=(P_2 h^2+P_4 h^4+P_6 h^6+\ldots)\times m\times\lambda$$

where Pn represents an even order coefficient, h represents a height from the optical axis, m represents a diffraction order, and $\lambda$ represents a design wavelength of a laser beam being used. More specifically, the optical path difference function $\phi(h)$ represents an optical path length difference defined, at the height h from the optical axis, between a hypothetical light ray not diffracted by the diffraction lens structure and a light ray diffracted by the diffraction lens structure.

Table 9 shows the coefficients Pn of the optical path difference function defining the diffraction lens structure formed on the surface 11 of the objective lens 10.

TABLE 9

| Surface No. | P2 | P4 | P6 | P8 | P10 | P12 |
|---|---|---|---|---|---|---|
| 11 | −5.0000E+00 | −8.4400E−01 | 1.4100E−02 | −2.0400E−02 | 0.0000E+00 | 0.0000E+00 |

Table 10 shows diffraction orders of the first to third laser beams defined by the diffraction lens structure.

TABLE 10

| Surface No. | 1st Laser Beam | 2nd Laser Beam | 3rd Laser Beam |
|---|---|---|---|
| 11 | 2 | 1 | 1 |

Table 11 shows values of the intermediate terms of the conditions (1)-(5), and the value of the left term of the condition (9). It is noted that the optical pick-up 100 according to the first embodiment also satisfy the condition (2).

$$-0.25<f2\times M2-f1\times M1<-0.07 \quad (2)$$

TABLE 11

| Condition | Value |
|---|---|
| (1), (2) | −0.090 |
| (3) | 0.090 |
| (4) | 0.000 |
| (5) | −0.215 |
| (9) | 2.03 |

As can be seen from Table 11, the optical pick-up 100 according to the first embodiment satisfies the conditions (1)-(5) and (9).

Figure 3A:
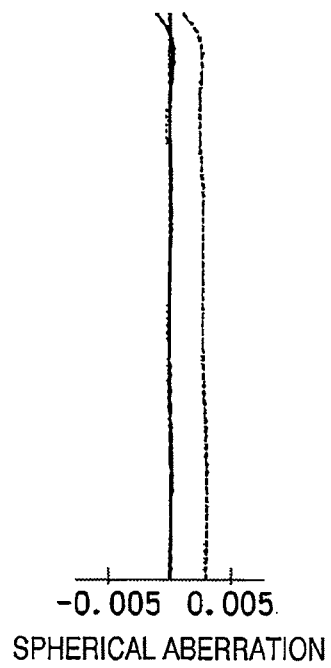
FIGS. 3A-3C show spherical aberration caused in the optical pick-up according to the first embodiment.
Figure 3B:
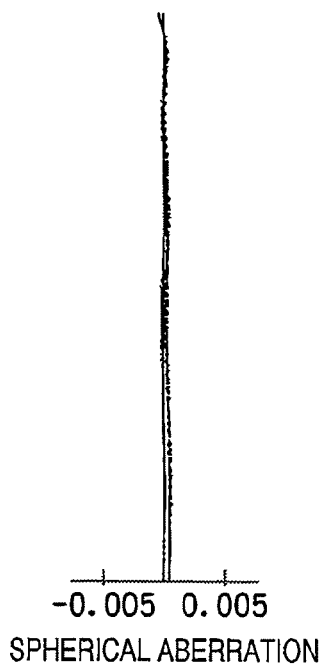
Figure 3C:
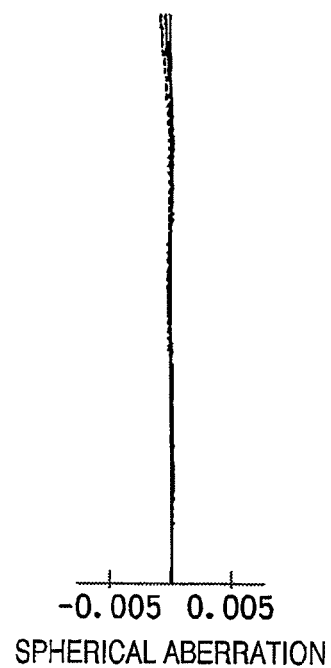

FIGS. 3A-3C show the spherical aberration caused in the optical pick-up 100 according to the first embodiment. More specifically, FIG. 3A is a graph illustrating the spherical aberration caused when the first optical disc is used, FIG. 3B is a graph illustrating the spherical aberration caused when the second optical disc is used, and FIG. 3C is a graph illustrating the spherical aberration caused when the third optical disc is used. In each of FIGS. 3A-3C, a curve indicated by a solid line represents the spherical aberration at a design wavelength, and a curve indicated by a dashed line represents the spherical aberration caused when the wavelength of the laser beam shifts by +5 nm from the design wavelength.

FIG. 4 is a graph illustrating, for each of the first embodiment and a first comparative example of an optical pick-up, the wavefront aberration caused when the temperature changes by +30 degrees. The first comparative example is designed to have the same focal lengths and the numerical apertures as those of the first embodiment, but to have the magnification of zero when the first optical disc is used. In FIG. 4 (and in the following similar graphs), a vertical axis represents the wavefront aberration (unit: $\lambda$), and a horizontal axis represents an entrance pupil.

In FIG. 4, a curve indicated by a thick solid line represents the wavefront aberration (0.028λ rms) caused in the first embodiment, and a curve indicated by a thin solid line represents the wavefront aberration (0.053λ rms) caused in the first comparative example. As can be seen from FIG. 4, the optical pick-up 100 according to the first embodiment is able to suppress the wavefront aberration to a low level even if the temperature changes, by setting the magnification defined when the first optical disc is used to have a positive value (i.e., setting the magnification to satisfy the conditions (1) to (3)).

Second Embodiment

Hereafter, an optical pick-up according to a second embodiment is explained. Since the optical pick-up according to the second embodiment has substantially the same optical block diagram as that of the first embodiment, the following explanation of the second embodiment focuses on the feature of the second embodiment.

The following Table 12 shows concrete specifications of a second embodiment of the optical pick-up 100. The optical block diagram of the optical pick-up 100 according to the second embodiment is shown in FIG. 1. The developed optical block diagram defined when the first optical disc is used is shown in FIG. 5A. The developed optical block diagram defined when the second optical disc is used is shown in FIG. 5B. The developed optical block diagram defined when the third optical disc is used is shown in FIG. 5C.

TABLE 12

|  | $1^{st}$ laser beam | $2^{nd}$ laser beam | $3^{rd}$ laser beam |
| --- | --- | --- | --- |
| Wavelength (nm) | 405 | 660 | 790 |
| Focal Length (mm) | 3.00 | 3.12 | 3.12 |
| NA | 0.65 | 0.60 | 0.47 |
| Magnification M | 0.030 | 0.000 | −0.041 |

Table 13 shows a specific numerical configuration defined when the first optical disc is used. The following Table 14 shows specific numerical configuration defined when the second optical disc is used. The following Table 15 shows specific numerical configuration defined when the third optical disc is used.

In this embodiment, the surface 11 of the objective lens 10 has two areas including a first area for securing the NA of 0.48 for the third optical disc, and a second area formed outside the first area. Since the first and second areas are separately designed, numeric values of the first and second areas are separately shown in the following Tables.

TABLE 13

| Surface No. | r | d | n (405 nm) |
| --- | --- | --- | --- |
| 0 |  | 2.17 |  |
| 1 | ∞ | 2.00 | 1.52972 |
| 2 | ∞ | 13.00 |  |
| 3 | 35.050 | 1.50 | 1.52469 |
| 4 | −10.000 | 6.70 |  |
| 5 | ∞ | 5.00 | 1.52972 |
| 6 | ∞ | 1.00 |  |
| 7 | ∞ | 5.00 | 1.52972 |
| 8 | ∞ | 3.19 |  |
| 9 ($1^{st}$ Area) | 1.920 | 2.30 | 1.52469 |
| 9 ($2^{nd}$ Area) | 1.920 |  |  |
| 10 | −6.739 | 1.23 |  |
| 11 | ∞ | 0.60 | 1.62231 |
| 12 | ∞ | — |  |

TABLE 14

| Surface No. | r | d | n (660 nm) |
| --- | --- | --- | --- |
| 0 |  | 2.30 |  |
| 1 | ∞ | 2.00 | 1.51374 |
| 2 | ∞ | 11.00 |  |
| 3 | 83.700 | 1.50 | 1.54044 |
| 4 | −9.250 | 5.00 |  |
| 5 | ∞ | 5.00 | 1.51374 |
| 6 | ∞ | 1.00 |  |
| 7 | ∞ | 5.00 | 1.51374 |
| 8 | ∞ | 3.00 |  |
| 9 ($1^{st}$ Area) | 1.920 | 2.30 | 1.50635 |
| 9 ($2^{nd}$ Area) | 1.920 |  |  |
| 10 | −6.739 | 1.42 |  |
| 11 | ∞ | 0.60 | 1.57961 |
| 12 | ∞ | — |  |

TABLE 15

| Surface No. | r | d | n (790 nm) |
| --- | --- | --- | --- |
| 0 |  | 2.30 |  |
| 1 | ∞ | 2.00 | 1.51052 |
| 2 | ∞ | 11.00 |  |
| 3 | −58.420 | 1.50 | 1.53653 |
| 4 | −9.530 | 8.15 |  |
| 5 | ∞ | 5.00 | 1.51052 |
| 6 | ∞ | 3.26 |  |
| 7 ($1^{st}$ Area) | 1.920 | 2.30 | 1.50313 |
| 7 ($2^{nd}$ Area) | 1.920 |  |  |
| 8 | −6.739 | 1.16 |  |
| 9 | ∞ | 1.20 | 1.57307 |
| 10 | ∞ | — |  |

In the Tables 13 and 14, the surface #0 represents a light source, the surfaces #1 and #2 respectively represent surfaces of the diffraction grating (2A or 2B), the surfaces #3 and #4 respectively represent surfaces of the coupling lens (3A or 3B), the surfaces #5 and #6 respectively represent surfaces of the beam splitter 41, the surfaces #7 and #8 respectively represent surfaces of the beam splitter 42, the surface #9 and #10 respectively represent the surfaces 11 and 12 of the objective lens 10, and the surfaces #11 and #12 respectively represent the protective layer and the record surface of the corresponding optical disc. In Table 15, the surface #0 represents a light source, the surfaces #1 and #2 respectively represent surfaces of the diffraction grating (2C), the surfaces #3 and #4 respectively represent surfaces of the coupling lens (3C), and the surfaces #5 and #6 respectively represent surfaces of the beam splitter 42, the surface #7 and #8 respectively represent the surfaces 11 and 12 of the objective lens 10, and the surfaces #9 and #10 respectively represent the protective layer and the record surface of the corresponding optical disc.

Each of the disc side surfaces (surface #4) of the coupling lenses 3A, 3B and 3C and the surfaces 11 and 12 of the objective lens 10 is a rotationally-symmetrical aspherical surface.

The following Table 16 shows the cone constants κ and aspherical coefficients specifying the shape of each of the disc side surface (surface #4) of the coupling lens 3A and the surfaces 11 and 12 of the objective lens 10. The following Table 17 shows the cone constant κ and aspherical coefficients specifying the shape of the disc side surface (surface #4) of the coupling lens 3B. The following Table 18 shows the cone constant K and aspherical coefficients specifying the shape of the disc side surface (surface #4) of the coupling lens 3C.

TABLE 16

| Surface No. | κ | A4 | A6 | A8 | A10 | A12 |
|---|---|---|---|---|---|---|
| 4 | 0.0000 | 1.4070E−04 | 9.0000E−07 | 4.4100E−09 | 0.0000E+00 | 0.0000E+00 |
| 9 (1st Area) | −0.6000 | 1.7380E−03 | 3.1260E−04 | −8.3000E−06 | 4.4400E−06 | −1.5780E−06 |
| 9 (2nd Area) | −0.6000 | 3.8410E−03 | −3.0860E−04 | −1.0980E−04 | 3.6200E−05 | −4.2570E−06 |
| 10 | 0.0000 | 3.0110E−02 | −9.9180E−03 | 2.3150E−03 | −3.0700E−04 | 1.3960E−05 |

TABLE 17

| Surface No. | κ | A4 | A6 | A8 | A10 | A12 |
|---|---|---|---|---|---|---|
| 4 | 0.0000 | 1.1350E−04 | 1.0100E−06 | 7.4600E−09 | 0.0000E+00 | 0.0000E+00 |

TABLE 18

| Surface No. | κ | A4 | A6 | A8 | A10 | A12 |
|---|---|---|---|---|---|---|
| 4 | 0.0000 | 4.0690E−05 | 4.1200E−07 | 3.7000E−09 | 0.0000E+00 | 0.0000E+00 |

Table 19 shows the coefficients Pn of the optical path difference function defining the diffraction lens structure formed on each of the first and second areas on the surface 11 of the objective lens 10. The second area is configured to converge the first laser beam having the wavelength of 405 nm and the second laser beam having the wavelengths of 660 nm onto the record surfaces of the first and second optical discs, respectively, and not to contribute to convergence of the third laser beam having the wavelength of 790 nm. Such a configuration enables the objective lens 10 to have a function as an aperture stop for the third laser beam. Therefore, it is possible to set the beam spot to have a desired value for the third laser beam.

More specifically, the diffraction lens structure in the second area is formed by combining a diffraction lens structure (step structure) which gives, at each step, an optical path length difference equal to $2\lambda_1$ (or $-2\lambda_1$) to the first laser beam having the wavelength of $\lambda_1$ (405 nm) and a diffraction lens structure (step structure) which gives, at each step, an optical path length difference equal to $5\lambda_1$ (or $-\lambda_1$) to the first laser beam having the wavelength of $\lambda_1$ (405 nm). By thus combining the two types of step structures providing different optical path length differences, it is possible to suitably converge the first and second laser beams on the record surfaces of the first and second optical discs, respectively, and to control the spherical aberration caused when the wavelength of the laser beam being used changes by a minute amount. In Table 19, optical path difference functions respectively defining the two types of diffraction lens structures for the second area are shown.

Table 20 shows diffraction orders of the first to third laser beams defined by the diffraction lens structures formed in the first and second areas. In Table 20, effective radiuses of the first and second areas are also shown.

TABLE 20

| | 1st Laser Beam | 2nd Laser Beam | 3rd Laser Beam | Effective Radius |
|---|---|---|---|---|
| 1st Area | 2 | 1 | 1 | 1.510 |
| 2nd Area (1) | 2 | 1 | — | 1.900 |
| 2nd Area (2) | 5 | 3 | — | |

Table 21 shows values of the intermediate terms of the conditions (1)-(5), and the value of the left term of the condition (9).

TABLE 21

| Condition | Value |
|---|---|
| (1), (2) | −0.090 |
| (3) | 0.090 |
| (4) | 0.000 |
| (5) | −0.218 |
| (9) | 2.03 |

As can be seen from Table 21, the optical pick-up 100 according to the second embodiment satisfies the conditions (1)-(5) and (9).

TABLE 19

| Surface No. | P2 | P4 | P6 | P8 | P10 | P12 |
|---|---|---|---|---|---|---|
| 1st Area | −1.0000E+01 | −9.6600E−01 | −1.3300E−02 | −1.4200E−02 | 0.0000E+00 | 0.0000E+00 |
| 2nd Area (1) | −1.0000E+01 | −6.4800E−01 | −2.7500E−01 | 3.9100E−02 | 0.0000E+00 | 0.0000E+00 |
| 2nd Area (2) | 0.0000E+00 | 4.6800E−01 | −1.6000E−01 | 0.0000E+00 | 0.0000E+00 | 0.0000E+00 |

FIGS. 6A-6C show the spherical aberration caused in the optical pick-up 100 according to the second embodiment. More specifically, FIG. 6A is a graph illustrating the spherical aberration caused when the first optical disc is used, FIG. 6B is a graph illustrating the spherical aberration caused when the second optical disc is used, and FIG. 6C is a graph illustrating the spherical aberration caused when the third optical disc is used. In each of FIGS. 6A-6C, a curve indicated by a solid line represents the spherical aberration at a design wavelength, and a curve indicated by a dashed line represents the spherical aberration caused when the wavelength of the laser beam shifts by +5 nm from the design wavelength.

FIG. 7 is a graph illustrating, for each of the second embodiment and the first comparative example of an optical pick-up, the wavefront aberration caused when the temperature changes by +30 degrees.

In FIG. 7, a curve indicated by a thick solid line represents the wavefront aberration (0.023λ rms) caused in the second embodiment, and a curve indicated by a thin solid line represents the wavefront aberration (0.053λ rms) caused in the first comparative example. As can be seen from FIG. 7, the optical pick-up 100 according to the second embodiment is able to suppress the wavefront aberration to a low level even if the temperature changes, by setting the magnification defined when the first optical disc is used to have a positive value (i.e., setting the magnification to satisfy the conditions (1) to (3)).

Third Embodiment

Hereafter, an optical pick-up according to a third embodiment is explained. Since the optical pick-up according to the third embodiment has substantially the same optical block diagram as that of the first embodiment, the following explanation of the third embodiment focuses on the feature of the third embodiment.

The following Table 22 shows concrete specifications of a third embodiment of the optical pick-up 100. The optical block diagram of the optical pick-up 100 according to the third embodiment is shown in FIG. 1. The developed optical block diagram defined when the first optical disc is used is shown in FIG. 8A. The developed optical block diagram defined when the second optical disc is used is shown in FIG. 8B. The developed optical block diagram defined when the third optical disc is used is shown in FIG. 8C.

TABLE 22

|  | 1st laser Beam | 2nd laser Beam | 3rd laser Beam |
|---|---|---|---|
| Wavelength (nm) | 405 | 660 | 790 |
| Focal Length (mm) | 2.30 | 2.37 | 2.39 |
| NA | 0.66 | 0.60 | 0.47 |
| Magnification M | 0.035 | 0.000 | −0.050 |

Table 23 shows a specific numerical configuration defined when the first optical disc is used. The following Table 24 shows specific numerical configuration defined when the second optical disc is used. The following Table 25 shows specific numerical configuration defined when the third optical disc is used.

In this embodiment, the surface 11 of the objective lens 10 has three areas including a first area for securing the NA of 0.47 for the third optical disc, a second area formed outside the first area to secure the NA of 0.60 for the second optical disc and a third area formed outside the second area. Since the first to third areas are separately designed, numeric values of the first to second areas are separately shown in the following Tables.

TABLE 23

| Surface No. | r | d | n (405 nm) |
|---|---|---|---|
| 0 |  | 2.46 |  |
| 1 | ∞ | 2.00 | 1.52972 |
| 2 | ∞ | 9.00 |  |
| 3 | 23.880 | 1.50 | 1.52469 |
| 4 | −7.900 | 5.66 |  |
| 5 | ∞ | 3.40 | 1.52972 |
| 6 | ∞ | 1.00 |  |
| 7 | ∞ | 3.40 | 1.52972 |
| 8 | ∞ | 2.13 |  |
| 9 (1st Area) | 1.375 | 1.80 | 1.52469 |
| 9 (2nd Area) | 1.375 |  |  |
| 9 (3rd Area) | 1.375 |  |  |
| 10 | −4.387 | 0.85 |  |
| 11 | ∞ | 0.60 | 1.62231 |
| 12 | ∞ | — |  |

TABLE 24

| Surface No. | r | d | n (660 nm) |
|---|---|---|---|
| 0 |  | 2.81 |  |
| 1 | ∞ | 2.00 | 1.51374 |
| 2 | ∞ | 7.00 |  |
| 3 | 57.000 | 1.50 | 1.54044 |
| 4 | −7.250 | 5.00 |  |
| 5 | ∞ | 3.40 | 1.51374 |
| 6 | ∞ | 1.00 |  |
| 7 | ∞ | 3.40 | 1.51374 |
| 8 | ∞ | 2.00 |  |
| 9 (1st Area) | 1.375 | 1.80 | 1.50635 |
| 9 (2nd Area) | 1.375 |  |  |
| 9 (3rd Area) | 1.375 |  |  |
| 10 | −4.387 | 0.98 |  |
| 11 | ∞ | 0.60 | 1.57961 |
| 12 | ∞ | — |  |

TABLE 25

| Surface No. | r | d | n (790 nm) |
|---|---|---|---|
| 0 |  | 2.36 |  |
| 1 | ∞ | 2.00 | 1.51052 |
| 2 | ∞ | 7.00 |  |
| 3 | −33.470 | 1.50 | 1.53653 |
| 4 | −7.280 | 5.99 |  |
| 5 | ∞ | 3.40 | 1.51052 |
| 6 | ∞ | 2.24 |  |
| 7 (1st Area) | 1.375 | 1.80 | 1.50313 |
| 7 (2nd Area) | 1.375 |  |  |
| 7 (3rd Area) | 1.375 |  |  |
| 8 | −4.387 | 0.74 |  |
| 9 | ∞ | 1.20 | 1.57307 |
| 10 | ∞ | — |  |

In the Tables 23 and 24, the surface #0 represents a light source, the surfaces #1 and #2 respectively represent surfaces of the diffraction grating (2A or 2B), the surfaces #3 and #4 respectively represent surfaces of the coupling lens (3A or 3B), the surfaces #5 and #6 respectively represent surfaces of the beam splitter 41, the surfaces #7 and #8 respectively represent surfaces of the beam splitter 42, the surface #9 and #10 respectively represent the surfaces 11 and 12 of the objective lens 10, and the surfaces #11 and #12 respectively represent the protective layer and the record surface of the corresponding optical disc. In Table 25, the surface #0 represents a light source, the surfaces #1 and #2 respectively represent surfaces of the diffraction grating (2C), the surfaces #3 and #4 respectively represent surfaces of the coupling lens (3C), and the surfaces #5 and #6 respectively represent surfaces of the beam splitter 42, the surface #7 and #8 respectively represent the surfaces 11 and 12 of the objective lens 10, and the surfaces #9 and #10 respectively represent the protective layer and the record surface of the corresponding optical disc.

Each of the disc side surfaces (surface #4) of the coupling lenses 3A, 3B and 3C and the surfaces 11 and 12 of the objective lens 10 is a rotationally-symmetrical aspherical surface.

The following Table 26 shows the cone constants K and aspherical coefficients specifying the shape of each of the disc side surface (surface #4) of the coupling lens 3A and the surfaces 11 and 12 of the objective lens 10. The following Table 27 shows the cone constant K and aspherical coefficients specifying the shape of the disc side surface (surface #4) of the coupling lens 3B. The following Table 28 shows the cone constant K and aspherical coefficients specifying the shape of the disc side surface (surface #4) of the coupling lens 3C.

onto the record surfaces of the first and second optical discs, respectively, and not to contribute to convergence of the third laser beam having the wavelength of 790 nm.

More specifically, the diffraction lens structure in the second area is formed by combining a diffraction lens structure (step structure) which gives, at each step, an optical path length difference equal to $2\lambda_1$ (or $-2\lambda_1$) to the first laser beam having the wavelength of $\lambda_1$ (405 nm) and a diffraction lens structure (step structure) which gives, at each step, an optical path length difference equal to $5\lambda_1$ (or $-5\lambda_1$) to the first laser beam having the wavelength of $\lambda_1$ (405 nm). In Table 29, optical path difference functions respectively defining the two types of diffraction lens structures for the second area are shown.

The third area is configured to converge only the first laser beam having the wavelength of 405 nm. More specifically, the diffraction lens structure in the third area is configured such that an optical path length difference given, at each step, to the first laser beam having the wavelength of 405 nm is different

TABLE 26

| Surface No. | κ | A4 | A6 | A8 | A10 | A12 |
|---|---|---|---|---|---|---|
| 4 | 0.0000 | 3.1170E−04 | 3.0900E−06 | 2.2700E−08 | 0.0000E+00 | 0.0000E+00 |
| 9(1st Area) | −0.6000 | 2.8070E−03 | 1.5870E−03 | 2.6130E−04 | −6.6360E−05 | 8.8980E−05 |
| 9(2nd Area) | −0.6000 | 1.1600E−02 | −2.5620E−03 | −9.9330E−04 | 4.2580E−04 | −5.9520E−05 |
| 9(3rd Area) | −0.6000 | 7.8390E−03 | −2.7848E−03 | 1.2740E−03 | −4.8880E−04 | 1.2093E−04 |
| 10 | 0.0000 | 8.0180E−02 | −4.4450E−02 | 2.7680E−02 | −1.2170E−02 | 2.3830E−03 |

TABLE 27

| Surface No. | κ | A4 | A6 | A8 | A10 | A12 |
|---|---|---|---|---|---|---|
| 4 | 0.0000 | 2.4040E−04 | 3.4800E−06 | 4.1800E−08 | 0.0000E+00 | 0.0000E+00 |

TABLE 28

| Surface No. | κ | A4 | A6 | A8 | A10 | A12 |
|---|---|---|---|---|---|---|
| 4 | 0.0000 | 6.9470E−05 | 1.2500E−06 | 1.9900E−08 | 0.0000E+00 | 0.0000E+00 |

Table 29 shows the coefficients Pn of the optical path difference function defining the diffraction lens structure formed on each of the first to third areas on the surface 11 of the objective lens 10. The second area is configured to converge the first laser beam having the wavelength of 405 nm and the second laser beam having the wavelength of 660 nm from the optical path length difference given, at each step, to the first laser beam by the diffraction lens structure in the second area. The diffraction lens structure in the third area is configured to give, at each step, the optical path length difference equal to $\lambda_1$ (one wavelength) to the first laser beam having the wavelength of 405 nm.

TABLE 29

| Surface No. | P2 | P4 | P6 | P8 | P10 | P12 |
|---|---|---|---|---|---|---|
| 1st Area | 9.0000E+00 | −1.7500E+00 | 2.8300E−01 | −1.3580E−01 | 0.0000E+00 | 0.0000E+00 |
| 2nd Area (1) | 9.0000E+00 | −1.6800E+00 | 2.1300E−01 | −1.1850E−01 | 0.0000E+00 | 0.0000E+00 |
| 2nd Area (2) | 0.0000E+00 | 2.3000E+00 | −1.4400E+00 | 0.0000E+00 | 0.0000E+00 | 0.0000E+00 |
| 3rd Area | 1.8000E+01 | 2.5500E+00 | −4.2400E+00 | 0.0000E+00 | 0.0000E+00 | 0.0000E+00 |

Table 30 shows diffraction orders of the first to third laser beams defined by the diffraction lens structures formed in the first to third areas. In Table 30, effective radiuses of the first to third areas are also shown.

TABLE 30

|  | $1^{st}$ Laser Beam | $2^{nd}$ Laser Beam | $3^{rd}$ Laser Beam | Effective Radius |
|---|---|---|---|---|
| $1^{st}$ Area | 2 | 1 | 1 | 1.190 |
| $2^{nd}$ Area (1) | 2 | 1 | — | 1.420 |
| $2^{nd}$ Area (2) | 5 | 3 | — |  |
| $3^{rd}$ Area | 1 | — | — | 1.455 |

Table 31 shows values of the intermediate terms of the conditions (1)-(5), and the value of the left term of the condition (9).

TABLE 31

| Condition | Value |
|---|---|
| (1), (2) | −0.081 |
| (3) | 0.081 |
| (4) | 0.000 |
| (5) | −0.200 |
| (9) | 2.03 |

As can be seen from Table 31, the optical pick-up 100 according to the third embodiment satisfies the conditions (1)-(5) and (9).

FIGS. 9A-9C show the spherical aberration caused in the optical pick-up 100 according to the third embodiment. More specifically, FIG. 9A is a graph illustrating the spherical aberration caused when the first optical disc is used, FIG. 9B is a graph illustrating the spherical aberration caused when the second optical disc is used, and FIG. 9C is a graph illustrating the spherical aberration caused when the third optical disc is used. In each of FIGS. 9A-9C, a curve indicated by a solid line represents the spherical aberration at a design wavelength, and a curve indicated by a dashed line represents the spherical aberration caused when the wavelength of the laser beam shifts by +5 nm from the design wavelength.

FIG. 10 is a graph illustrating, for each of the third embodiment and a second comparative example of an optical pick-up, the wavefront aberration caused when the temperature changes by +30 degrees. The second comparative example is designed to have the same focal lengths and the numerical apertures as those of the third embodiment, but to have the magnification of zero when the first optical disc is used.

In FIG. 10, a curve indicated by a thick solid line represents the wavefront aberration (0.014λ rms) caused in the third embodiment, and a curve indicated by a thin solid line represents the wavefront aberration (0.068λ rms) caused in the second comparative example. As can be seen from FIG. 10, the optical pick-up 100 according to the third embodiment is able to suppress the wavefront aberration to a low level even if the temperature changes, by setting the magnification defined when the first optical disc is used to have a positive value (i.e., setting the magnification to satisfy the conditions (1) to (3)).

Fourth Embodiment

Hereafter, an optical pick-up 200 according to a fourth embodiment is described. FIG. 11 is an optical block diagram of the optical pick-up 200 according to the fourth embodiment. The developed optical block diagram defined when the first optical disc is used is shown in FIG. 12A. The developed optical block diagram defined when the second optical disc is used is shown in FIG. 12B. The developed optical block diagram defined when the third optical disc is used is shown in FIG. 12C.

In this embodiment, a module (1D, 1E) in which a light source and a detector are integrally formed on a common substrate so that the entire optical pick-up 200 is compact in size in comparison with the optical pick-up 100 according to the first to third embodiments.

More specifically, a module 1D is configured such that a laser device emitting the first laser beam having the wavelength of 405 nm and a detector are integrally formed on a common substrate. The first laser beam emitted by the laser device of the module 1D passes through a diffraction grating 2D, is converted into a converging beam by a coupling lens 3D, and passes through a beam splitter 43. The first laser beam emerging from the beam splitter 43 is then incident on an objective lens 10A, and is converged by the objective lens 10A to form a beam spot on the record surface of the first optical disc (e.g., HD DVD). A returning beam from the record surface of the first optical disc passes along the same optical path defined from the diffraction grating 2D to the first optical disc, and is deflected by the diffraction grating 2D to impinge on the detector of the module 1D.

A module 1E is configured such that laser devices respectively emitting the second and third laser beams having the wavelengths of 660 nm and 790 nm and a detector are integrally formed on a common substrate. Each of the second and third laser beams emitted by the laser devices of the module 1E passes through a diffraction grating 2E, is converted into a collimated beam by a coupling lens 3E, and is reflected by the beam splitter 43. Each of the second and third laser beams emerging from the beam splitter 43 is then incident on the objective lens 10A, and is converged by the objective lens 10A to form a beam spot on the record surface of the corresponding optical disc (e.g., DVD or CD). A returning beam from the record surface of the second or third optical disc passes along the same optical path defined from the diffraction grating 2E to the optical disc, and is deflected by the diffraction grating 2E to impinge on the detector of the module 1E.

The following Table 32 shows concrete specifications of the optical pick-up 200 according to the third embodiment.

TABLE 32

|  | $1^{st}$ laser beam | $2^{nd}$ laser beam | $3^{rd}$ laser beam |
|---|---|---|---|
| Wavelength (nm) | 405 | 660 | 790 |
| Focal Length (mm) | 3.00 | 3.12 | 3.12 |
| NA | 0.65 | 0.65 | 0.51 |
| Magnification M | 0.066 | 0.000 | −0.001 |

Table 33 shows a specific numerical configuration defined when the first optical disc is used. The following Table 34 shows specific numerical configuration defined when the second optical disc is used. The following Table 35 shows specific numerical configuration defined when the third optical disc is used.

In this embodiment, the surface 11 of the objective lens 10 has three areas including a first area for securing the NA of 0.51 for the third optical disc, a second area formed outside the first area to secure the NA of 0.65 for the second optical disc and a third area formed outside the second area. Since the first to third areas are separately designed, numeric values of the first to second areas are separately shown in the following Tables.

TABLE 33

| Surface No. | r | d | n (405 nm) |
|---|---|---|---|
| 0 |  | 2.94 |  |
| 1 | ∞ | 2.00 | 1.52972 |
| 2 | ∞ | 13.00 |  |
| 3 | 22.060 | 1.50 | 1.52469 |
| 4 | −10.190 | 4.76 |  |
| 5 | ∞ | 5.00 | 1.52972 |
| 6 | ∞ | 3.29 |  |
| 7 (1$^{st}$ Area) | 1.835 | 2.30 | 1.52469 |
| 7 (2$^{nd}$ Area) | 1.835 |  |  |
| 7 (3$^{rd}$ Area) | 1.835 |  |  |
| 8 | −8.026 | 1.09 |  |
| 9 | ∞ | 0.60 | 1.62231 |
| 10 | ∞ | — |  |

TABLE 34

| Surface No. | r | d | n (660 nm) |
|---|---|---|---|
| 0 |  | 2.79 |  |
| 1 | ∞ | 2.00 | 1.51374 |
| 2 | ∞ | 14.00 |  |
| 3 | 107.200 | 1.50 | 1.54044 |
| 4 | −11.300 | 5.00 |  |
| 5 | ∞ | 5.00 | 1.51374 |
| 6 | ∞ | 3.00 |  |
| 7 (1$^{st}$ Area) | 1.835 | 2.30 | 1.50635 |
| 7 (2$^{nd}$ Area) | 1.835 |  |  |
| 7 (3$^{rd}$ Area) | 1.835 |  |  |
| 8 | −8.026 | 1.38 |  |
| 9 | ∞ | 0.60 | 1.57961 |
| 10 | ∞ | — |  |

TABLE 35

| Surface No. | r | d | n (790 nm) |
|---|---|---|---|
| 0 |  | 2.79 |  |
| 1 | ∞ | 2.00 | 1.51052 |
| 2 | ∞ | 14.00 |  |
| 3 | 107.200 | 1.50 | 1.53653 |
| 4 | −11.300 | 5.00 |  |
| 5 | ∞ | 5.00 | 1.51052 |
| 6 | ∞ | 3.38 |  |
| 7 (1$^{st}$ Area) | 1.835 | 2.30 | 1.50313 |
| 7 (2$^{nd}$ Area) | 1.835 |  |  |
| 7 (3$^{rd}$ Area) | 1.835 |  |  |
| 8 | −8.026 | 1.00 |  |
| 9 | ∞ | 1.20 | 1.57307 |
| 10 | ∞ | — |  |

In the Tables 33-35, the surface #0 represents the module (1D or 1E), the surfaces #1 and #2 respectively represent surfaces of the diffraction grating (2D or 2E), the surfaces #3 and #4 respectively represent surfaces of the coupling lens (3D or 3E), the surfaces #5 and #6 respectively represent surfaces of the beam splitter 43, the surface #7 and #8 respectively represent surfaces 11A and 12A of the objective lens 10, and the surfaces #9 and #10 respectively represent the protective layer and the record surface of the corresponding optical disc.

Each of the disc side surfaces (surface #4) of the coupling lenses 3D and 3E and the surfaces 11 and 12 of the objective lens 10 is a rotationally-symmetrical aspherical surface.

The following Table 36 shows the cone constants κ and aspherical coefficients specifying the shape of each of the disc side surface (surface #4) of the coupling lens 3D and the surfaces 11A and 12A of the objective lens 10. The following Table 37 shows the cone constant κ and aspherical coefficients specifying the shape of the disc side surface (surface #4) of the coupling lens 3E.

TABLE 36

| Surface No. | κ | A4 | A6 | A8 | A10 | A12 |
|---|---|---|---|---|---|---|
| 4 | 0.0000 | 2.0020E−04 | 9.5000E−07 | 2.7400E−09 | 0.0000E+00 | 0.0000E+00 |
| 7(1$^{st}$ Area) | −0.6000 | 7.1330E−04 | 2.6690E−04 | −1.5730E−04 | 4.4610E−05 | −1.0534E−05 |
| 7(2$^{nd}$ Area) | −0.6000 | −3.1270E−03 | 2.5790E−03 | −7.5930E−04 | 2.1850E−04 | −2.6262E−05 |
| 7(3$^{rd}$ Area) | −0.6000 | −9.5300E−03 | 1.4544E−02 | −6.7488E−03 | 1.4288E−03 | −1.1771E−04 |
| 8 | 0.0000 | 3.6650E−02 | −1.3880E−02 | 3.5420E−03 | −6.3830E−04 | 5.1160E−05 |

TABLE 37

| Surface No. | κ | A4 | A6 | A8 | A10 | A12 |
|---|---|---|---|---|---|---|
| 4 | 0.0000 | 6.2300E−05 | 3.6600E−07 | 1.8400E−09 | 0.0000E+00 | 0.0000E+00 |

Table 38 shows the coefficients Pn of the optical path difference function defining the diffraction lens structure formed on each of the first to third areas on the surface 11 of the objective lens 10. The second area is configured to converge the first laser beam having the wavelength of 405 nm and the second laser beam having the wavelength of 660 nm onto the record surfaces of the first and second optical discs, respectively, and not to contribute to convergence of the third laser beam having the wavelength of 790 nm.

More specifically, the diffraction lens structure in the second area is formed by combining a diffraction lens structure (step structure) which gives, at each step, an optical path length difference equal to $2\lambda_1$ (or $-2\lambda_1$) to the first laser beam having the wavelength of $\lambda_1$ (405 nm) and a diffraction lens structure (step structure) which gives, at each step, an optical path length difference equal to $5\lambda_1$ (or $-5\lambda_1$) to the first laser beam having the wavelength of $\lambda_1$, (405 nm). In Table 38, optical path difference functions respectively defining the two types of diffraction lens structures for the second area are shown.

The third area is configured to converge only the second laser beam having the wavelength of 660 nm. More specifically, the diffraction lens structure in the third area is configured such that an optical path length difference given, at each step, to the second laser beam having the wavelength of 660 nm is different from the optical path length difference given, at each step, to the second laser beam by the diffraction lens structure in the second area. The diffraction lens structure in the third area is configured to give, at each step, the optical path length difference equal to 2 (one wavelength) to the second laser beam having the wavelength of 660 nm.

13B is a graph illustrating the spherical aberration caused when the second optical disc is used, and FIG. 13C is a graph illustrating the spherical aberration caused when the third optical disc is used. In each of FIGS. 13A-13C, a curve indicated by a solid line represents the spherical aberration at a design wavelength, and a curve indicated by a dashed line represents the spherical aberration caused when the wavelength of the laser beam shifts by +5 nm from the design wavelength.

FIG. 14 is a graph illustrating, for each of the fourth embodiment and the first comparative example of an optical pick-up, the wavefront aberration caused when the temperature changes by +30 degrees. The second comparative example is designed to have the same focal lengths and the numerical apertures as those of the third embodiment, but to have the magnification of zero when the first optical disc is used.

In FIG. 14, a curve indicated by a thick solid line represents the wavefront aberration (0.032λ rms) caused in the fourth embodiment, and a curve indicated by a thin solid line repre-

TABLE 38

| Surface No. | P2 | P4 | P6 | P8 | P10 | P12 |
|---|---|---|---|---|---|---|
| $1^{st}$ Area | −7.0000E+00 | −2.5600E+00 | −1.7300E−01 | −5.9700E−02 | 0.0000E+00 | 0.0000E+00 |
| $2^{nd}$ Area (1) | −7.0000E+00 | −2.5500E+00 | −9.5700E−02 | −9.5300E−02 | 0.0000E+00 | 0.0000E+00 |
| $2^{nd}$ Area (2) | 0.0000E+00 | −8.4600E−01 | 3.6500E−01 | 0.0000E+00 | 0.0000E+00 | 0.0000E+00 |
| $3^{rd}$ Area | −7.0000E+00 | −1.3589E+00 | −3.5470E−01 | 0.0000E+00 | 0.0000E+00 | 0.0000E+00 |

Table 39 shows diffraction order of the first to third laser beams defined by the diffraction lens structures formed in the first to third areas. In Table 39, effective radiuses of the first to third areas are also shown.

TABLE 39

| | $1^{st}$ Laser Beam | $2^{nd}$ Laser Beam | $3^{rd}$ Laser Beam | Effective Radius |
|---|---|---|---|---|
| $1^{st}$ Area | 2 | 1 | 1 | 1.590 |
| $2^{nd}$ Area (1) | 2 | 1 | — | 1.800 |
| $2^{nd}$ Area (2) | 5 | 3 | — | |
| $3^{rd}$ Area | — | 1 | — | 2.025 |

Table 40 shows values of the intermediate terms of the conditions (1)-(5), and the value of the left term of the condition (9).

TABLE 40

| Condition | Value |
|---|---|
| (1), (2) | −0.198 |
| (3) | 0.198 |
| (4) | 0.000 |
| (5) | −0.201 |
| (9) | 2.03 |

As can be seen from Table 40, the optical pick-up 200 according to the fourth embodiment satisfies the conditions (1)-(5) and (9).

FIGS. 13A-13C show the spherical aberration caused in the optical pick-up 200 according to the fourth embodiment. More specifically, FIG. 13A is a graph illustrating the spherical aberration caused when the first optical disc is used, FIG.

sents the wavefront aberration (0.053λ rms) caused in the first comparative example. As can be seen from FIG. 14, the optical pick-up 200 according to the fourth embodiment is able to suppress the wavefront aberration to a low level even if the temperature changes, by setting the magnification defined when the first optical disc is used to have a positive value (i.e., setting the magnification to satisfy the conditions (1) to (3)).

Fifth Embodiment

Hereafter, an optical pick-up according to a fifth embodiment is explained. Since the optical pick-up according to the fifth embodiment has substantially the same optical block diagram as that of the first embodiment, the following explanation of the fifth embodiment focuses on the feature of the fifth embodiment.

The following Table 41 shows concrete specifications of the fifth embodiment of the optical pick-up 100. The optical block diagram of the optical pick-up 100 according to the fifth embodiment is shown in FIG. 1. The developed optical block diagram defined when the first optical disc (BD; Blu-ray Disc) is used is shown in FIG. 15A. The developed optical block diagram defined when the second optical disc is used is shown in FIG. 15B. The developed optical block diagram defined when the third optical disc is used is shown in FIG. 15C.

TABLE 41

| | $1^{st}$ laser beam | $2^{nd}$ laser beam | $3^{rd}$ laser beam |
|---|---|---|---|
| Wavelength (nm) | 405 | 660 | 790 |
| Focal Length (mm) | 2.20 | 2.38 | 2.42 |

TABLE 41-continued

|  | 1st laser beam | 2nd laser beam | 3rd laser beam |
|---|---|---|---|
| NA | 0.85 | 0.60 | 0.47 |
| Magnification M | 0.059 | −0.071 | −0.043 |

Table 42 shows a specific numerical configuration defined when the first optical disc is used. The following Table 43 shows specific numerical configuration defined when the second optical disc is used. The following Table 44 shows specific numerical configuration defined when the third optical disc is used.

In this embodiment, the surface 11 of the objective lens 10 has three areas including a first area for securing the NA of 0.47 for the third optical disc, a second area formed outside the first area to secure the NA of 0.60 for the second optical disc and a third area formed outside the second area. Since the first to third areas are separately designed, numeric values of the first to second areas are separately shown in the following Tables. FIG. 22 is a conceptual illustration of the surface 11 of the objective lens 10 including the first to third areas.

TABLE 42

| Surface No. | r | d | n (405 nm) |
|---|---|---|---|
| 0 |  | 2.69 |  |
| 1 | ∞ | 2.00 | 1.52972 |
| 2 | ∞ | 26.00 |  |
| 3 | 118.130 | 1.20 | 1.52469 |
| 4 | −58.000 | 2.32 |  |
| 5 | ∞ | 5.00 | 1.52972 |
| 6 | ∞ | 1.00 |  |
| 7 | ∞ | 5.00 | 1.52972 |
| 8 | ∞ | 2.11 |  |
| 9 (1st Area) | 1.475 | 2.60 | 1.65098 |
| 9 (2nd Area) | 1.475 |  |  |
| 9 (3rd Area) | 1.475 |  |  |
| 10 | −15.041 | 0.49 |  |
| 11 | ∞ | 0.0875 | 1.62231 |
| 12 | ∞ | — |  |

TABLE 43

| Surface No. | r | d | n (660 nm) |
|---|---|---|---|
| 0 |  | 2.20 |  |
| 1 | ∞ | 2.00 | 1.51374 |
| 2 | ∞ | 8.00 |  |
| 3 | −15.114 | 1.20 | 1.54044 |
| 4 | −8.040 | 4.02 |  |
| 5 | ∞ | 5.00 | 1.51374 |
| 6 | ∞ | 1.00 |  |
| 7 | ∞ | 5.00 | 1.51374 |
| 8 | ∞ | 2.00 |  |
| 9 (1st Area) | 1.475 | 2.60 | 1.59978 |
| 9 (2nd Area) | 1.475 |  |  |
| 9 (3rd Area) | 1.475 |  |  |
| 10 | −15.041 | 0.60 |  |
| 11 | ∞ | 0.60 | 1.57961 |

TABLE 43-continued

| Surface No. | r | d | n (660 nm) |
|---|---|---|---|
| 12 | ∞ | — |  |

TABLE 44

| Surface No. | r | d | n (790 nm) |
|---|---|---|---|
| 0 |  | 2.35 |  |
| 1 | ∞ | 2.00 | 1.51052 |
| 2 | ∞ | 11.00 |  |
| 3 | −35.340 | 1.20 | 1.53653 |
| 4 | −9.550 | 7.25 |  |
| 5 | ∞ | 5.00 | 1.51052 |
| 6 | ∞ | 2.41 |  |
| 7 (1st Area) | 1.475 | 2.60 | 1.59073 |
| 7 (2nd Area) | 1.475 |  |  |
| 7 (3rd Area) | 1.475 |  |  |
| 8 | −15.041 | 0.19 |  |
| 9 | ∞ | 1.20 | 1.57307 |
| 10 | ∞ | — |  |

In the Tables 42 and 43, the surface #0 represents a light source, the surfaces #1 and #2 respectively represent surfaces of the diffraction grating (2A or 2B), the surfaces #3 and #4 respectively represent surfaces of the coupling lens (3A or 3B), the surfaces #5 and #6 respectively represent surfaces of the beam splitter 41, the surfaces #7 and #8 respectively represent surfaces of the beam splitter 42, the surface #9 and #10 respectively represent the surfaces 11 and 12 of the objective lens 10, and the surfaces #11 and #12 respectively represent the protective layer and the record surface of the corresponding optical disc. In Table 44, the surface #0 represents a light source, the surfaces #1 and #2 respectively represent surfaces of the diffraction grating (2C), the surfaces #3 and #4 respectively represent surfaces of the coupling lens (3C), and the surfaces #5 and #6 respectively represent surfaces of the beam splitter 42, the surface #7 and #8 respectively represent the surfaces 11 and 12 of the objective lens 10, and the surfaces #9 and #10 respectively represent the protective layer and the record surface of the corresponding optical disc.

Each of the disc side surfaces (surface #4) of the coupling lenses 3A, 3B and 3C and the surfaces 11 and 12 of the objective lens 10 is a rotationally-symmetrical aspherical surface.

The following Table 45 shows the cone constants K and aspherical coefficients specifying the shape of each of the disc side surface (surface #4) of the coupling lens 3A and the surfaces 11 and 12 of the objective lens 10. The following Table 46 shows the cone constant K and aspherical coefficients specifying the shape of the disc side surface (surface #4) of the coupling lens 3B. The following Table 47 shows the cone constant K and aspherical coefficients specifying the shape of the disc side surface (surface #4) of the coupling lens 3C.

TABLE 45

| Surface No. | κ | A4 | A6 | A8 | A10 | A12 |
|---|---|---|---|---|---|---|
| 4 | 0.0000 | 1.2430E−05 | −7.1440E−10 | 0.0000E+00 | 0.0000E+00 | 0.0000E+00 |
| 9(1st Area) | −0.7500 | 3.2160E−02 | −1.2400E−02 | 1.9800E−03 | −5.7190E−05 | −1.1560E−06 |
| 9(2nd Area) | −0.7500 | 2.2330E−02 | −2.2750E−03 | 1.5800E−03 | −3.8670E−04 | 1.0470E−04 |
| 9(3rd Area) | −0.7500 | 1.9520E−02 | 6.4960E−04 | 5.3950E−04 | −1.1720E−04 | 7.2240E−05 |

TABLE 45-continued

| | | | | | | |
|---|---|---|---|---|---|---|
| 10 | 0.0000 | 4.2670E-01 | -9.0410E-01 | 1.0910E+00 | -3.3660E-01 | -7.2990E-01 |

| | A14 | A16 | A18 | A20 | A22 | A24 |
|---|---|---|---|---|---|---|
| 4 | 0.0000E+00 | 0.0000E+00 | 0.0000E+00 | 0.0000E+00 | 0.0000E+00 | 0.0000E+00 |
| 9($1^{st}$ Area) | 0.0000E+00 | 0.0000E+00 | 0.0000E+00 | 0.0000E+00 | 0.0000E+00 | 0.0000E+00 |
| 9($2^{nd}$ Area) | 0.0000E+00 | 0.0000E+00 | 0.0000E+00 | 0.0000E+00 | 0.0000E+00 | 0.0000E+00 |
| 9($3^{rd}$ Area) | 0.0000E+00 | 0.0000E+00 | 0.0000E+00 | 0.0000E+00 | 0.0000E+00 | 0.0000E+00 |
| 10 | 2.3890E-01 | 8.3610E-01 | 4.3370E-01 | -2.0386E+00 | 1.1016E+00 | 0.0000E+00 |

TABLE 46

| Surface No. | κ | A4 | A6 | A8 | A10 | A12 |
|---|---|---|---|---|---|---|
| 4 | 0.0000 | -7.6350E-07 | -1.2980E-08 | 0.0000E+00 | 0.0000E+00 | 0.0000E+00 |

| | A14 | A16 | A18 | A20 | A22 | A24 |
|---|---|---|---|---|---|---|
| 4 | 0.0000E+00 | 0.0000E+00 | 0.0000E+00 | 0.0000E+00 | 0.0000E+00 | 0.0000E+00 |

TABLE 47

| Surface No. | κ | A4 | A6 | A8 | A10 | A12 |
|---|---|---|---|---|---|---|
| 4 | 0.0000 | 2.4200E-05 | 2.5800E-07 | 2.6400E-09 | 0.0000E+00 | 0.0000E+00 |

| | A14 | A16 | A18 | A20 | A22 | A24 |
|---|---|---|---|---|---|---|
| 4 | 0.0000E+00 | 0.0000E+00 | 0.0000E+00 | 0.0000E+00 | 0.0000E+00 | 0.0000E+00 |

Table 48 shows the coefficients Pn of the optical path difference function defining the diffraction lens structure formed on each of the first to third areas on the surface 11 of the objective lens 10 and the surface #4 of the coupling lenses 3A. The diffraction lens structure formed on the surface #4 of the coupling lenses 3A corrects the chromatic aberration. The second area on the surface 11 of the objective lens 10 is configured to converge the first laser beam having the wavelength of 405 nm and the second laser beam having the wavelength of 660 nm onto the record surfaces of the first and second optical discs, respectively, and not to contribute to convergence of the third laser beam having the wavelength of 790 nm. The third area is configured to converge only the first laser beam having the wavelength of 405 nm.

The diffraction lens structure in the second area is formed as a combination of a step giving an optical path length difference approximately equal to $2\lambda_1$ ($\lambda_1$=405 nm) or $-\lambda_1$ and a step giving an optical path length difference approximately equal to $5\lambda_1$ or $-5\lambda_1$. The diffraction lens structure in the third area is configured such that each step gives an optical path length difference approximately equal to $1\lambda_1$.

TABLE 48

| Surface No. | P2 | P4 | P6 | P8 | P10 | P12 |
|---|---|---|---|---|---|---|
| 4 | -3.0000E+01 | 0.0000E+00 | 0.0000E+00 | 0.0000E+00 | 0.0000E+00 | 0.0000E+00 |
| $1^{st}$ Area | 0.0000E+00 | 1.0610E+01 | -5.5400E+00 | 3.4300E-01 | -6.8080E-02 | 0.0000E+00 |
| $2^{nd}$ Area (1) | 0.0000E+00 | 1.1690E+01 | -6.5890E+00 | 5.1940E-01 | 0.0000E+00 | 0.0000E+00 |
| $2^{nd}$ Area (2) | 0.0000E+00 | 7.7930E-01 | -3.9540E-01 | 0.0000E+00 | 0.0000E+00 | 0.0000E+00 |
| $3^{rd}$ Area | 0.0000E+00 | 1.4800E+01 | -6.1310E+00 | 0.0000E+00 | 0.0000E+00 | 0.0000E+00 |

Table 49 shows diffraction orders of the first to third laser beams defined by the diffraction lens structures. In Table 49, effective radiuses of the first to third areas are also shown.

TABLE 49

| | $1^{st}$ Laser Beam | $2^{nd}$ Laser Beam | $3^{rd}$ Laser Beam | Effective Radius |
|---|---|---|---|---|
| $1^{st}$ Area | 2 | 1 | 1 | 1.190 |
| $2^{nd}$ Area (1) | 2 | 1 | — | 1.570 |
| $2^{nd}$ Area (2) | 5 | 3 | — | |
| $3^{rd}$ Area | 1 | — | — | 1.705 |

The optical pick-up according to the fifth embodiment satisfy the following conditions.

$$-0.35 < f2 \times M2 - f1 \times M1 < -0.17 \quad (6)$$

$$0.10 < f1 \times M1 < 0.35 \quad (7)$$

$$-0.31 < f3 \times M3 - f1 \times M1 < -0.20 \quad (8)$$

The condition (6) defines the difference between the magnification for the first optical disc (BD) and the magnification for the second optical disc (DVD). As in the case of the condition (1), if (f2×M2−f1×M1) gets larger than the upper limit of the condition (6), the amount of the spherical aberration due to temperature variations becomes to large. If (f2×M2−f1×M1) gets smaller than the lower limit of the condition (1), the relative amount of coma caused by an obliquely incident beam when the first and second optical discs are used becomes too large.

The condition (7) defines the magnification for the first optical disc (BD). If f1×M1 gets larger than the upper limit of the condition (7), the degree of convergence of the first laser beam for the first optical disc becomes too large and the amount of aberration caused during the tracking operation becomes too large when the first optical disc is used. If f1×M1 gets lower than the lower limit of the condition (7), the amount of the spherical aberration due to temperature variations becomes too large, the degree of divergence of the third laser beam for the third optical disc becomes too large, and thereby d the tracking performance deteriorates when the third optical disc is used.

The condition (8) defines the difference between the magnification for the first optical disc (BD) and the magnification for the third optical disc (CD). If (f3×M3−f1×M1) gets larger than the upper limit of the condition (8), an overcorrected spherical aberration remains. If (f3×M3−f1×M1) gets lower than the lower limit of the condition (8), an undercorrected spherical aberration occurs.

Table 50 shows values of the intermediate terms of the conditions (1), (4), (6)-(8).

TABLE 50

| Condition | Value |
| --- | --- |
| (1), (6) | −0.299 |
| (7) | 0.130 |
| (4) | −0.169 |
| (8) | −0.234 |
| (9) | 2.15 |

As can be seen from Table 50, the optical pick-up 100 according to the fifth embodiment satisfies the conditions (1) and (6)-(9).

FIGS. 16A-16C show the spherical aberration caused in the optical pick-up 100 according to the fifth embodiment. More specifically, FIG. 16A is a graph illustrating the spherical aberration caused when the first optical disc is used, FIG. 16B is a graph illustrating the spherical aberration caused when the second optical disc is used, and FIG. 16C is a graph illustrating the spherical aberration caused when the third optical disc is used. In each of FIGS. 16A-16C, a curve indicated by a solid line represents the spherical aberration at a design wavelength, and a curve indicated by a dashed line represents the spherical aberration caused when the wavelength of the laser beam shifts by +5 nm from the design wavelength.

FIG. 17 is a graph illustrating the wavefront aberration caused when the temperature changes by +30 degrees. In FIG. 17, a curve indicated by a thick solid line represents the wavefront aberration (0.024λ rms) caused in the fifth embodiment

Sixth Embodiment

Hereafter, an optical pick-up according to a sixth embodiment is explained. Since the optical pick-up according to the sixth embodiment has substantially the same optical block diagram as that of the first embodiment, the following explanation of the sixth embodiment focuses on the feature of the sixth embodiment.

The following Table 51 shows concrete specifications of the sixth embodiment of the optical pick-up 100. The optical block diagram of the optical pick-up 100 according to the sixth embodiment is shown in FIG. 1. The developed optical block diagram defined when the first optical disc (BD) is used is shown in FIG. 18A. The developed optical block diagram defined when the second optical disc is used is shown in FIG. 18B. The developed optical block diagram defined when the third optical disc is used is shown in FIG. 18C.

TABLE 51

| | $1^{st}$ laser beam | $2^{nd}$ laser beam | $3^{rd}$ laser beam |
| --- | --- | --- | --- |
| Wavelength (nm) | 405 | 660 | 790 |
| Focal Length (mm) | 2.20 | 2.38 | 2.42 |
| NA | 0.85 | 0.60 | 0.47 |
| Magnification M | 0.078 | 0.000 | −0.038 |

Table 52 shows a specific numerical configuration defined when the first optical disc is used. The following Table 53 shows specific numerical configuration defined when the second optical disc is used. The following Table 54 shows specific numerical configuration defined when the third optical disc is used.

In this embodiment, the surface 11 of the objective lens 10 has three areas including a first area for securing the NA of 0.47 for the third optical disc, a second area formed outside the first area to secure the NA of 0.60 for the second optical disc and a third area formed outside the second area. Since the first to third areas are separately designed, numeric values of the first to second areas are separately shown in the following Tables. The conceptual illustration of the surface 11 of the objective lens 10 including the first to third areas is shown in FIG. 22.

TABLE 52

| Surface No. | r | d | n (405 nm) |
| --- | --- | --- | --- |
| 0 | | 2.09 | |
| 1 | ∞ | 2.00 | 1.52972 |
| 2 | ∞ | 31.00 | |
| 3 | 27.596 | 1.20 | 1.52469 |
| 4 | −41.000 | 1.36 | |
| 5 | ∞ | 5.00 | 1.52972 |
| 6 | ∞ | 1.00 | |
| 7 | ∞ | 5.00 | 1.52972 |
| 8 | ∞ | 1.99 | |
| 9 ($1^{st}$ Area) | 1.465 | 2.60 | 1.65098 |
| 9 ($2^{nd}$ Area) | 1.465 | | |
| 9 ($3^{rd}$ Area) | 1.465 | | |
| 10 | −19.171 | 0.43 | |
| 11 | ∞ | 0.0875 | 1.62231 |
| 12 | ∞ | — | |

TABLE 53

| Surface No. | r | d | n (660 nm) |
| --- | --- | --- | --- |
| 0 | | 2.97 | |
| 1 | ∞ | 2.00 | 1.51374 |
| 2 | ∞ | 14.00 | |
| 3 | 113.300 | 1.20 | 1.54044 |
| 4 | −11.250 | 3.00 | |
| 5 | ∞ | 5.00 | 1.51374 |
| 6 | ∞ | 1.00 | |

TABLE 53-continued

| Surface No. | r | d | n (660 nm) |
|---|---|---|---|
| 7 | ∞ | 5.00 | 1.51374 |
| 8 | ∞ | 2.00 | |
| 9 (1st Area) | 1.465 | 2.60 | 1.59978 |
| 9 (2nd Area) | 1.465 | | |
| 9 (3rd Area) | 1.465 | | |
| 10 | −19.171 | 0.42 | |
| 11 | ∞ | 0.60 | 1.57961 |
| 12 | ∞ | — | |

TABLE 54

| Surface No. | r | d | n (790 nm) |
|---|---|---|---|
| 0 | | 2.40 | |
| 1 | ∞ | 2.00 | 1.51052 |
| 2 | ∞ | 12.00 | |
| 3 | −44.900 | 1.20 | 1.53653 |
| 4 | −10.100 | 5.59 | |
| 5 | ∞ | 5.00 | 1.51052 |
| 6 | ∞ | 2.25 | |
| 7 (1st Area) | 1.465 | 2.60 | 1.59073 |
| 7 (2nd Area) | 1.465 | | |
| 7 (3rd Area) | 1.465 | | |
| 8 | −19.171 | 0.17 | |
| 9 | ∞ | 1.20 | 1.57307 |
| 10 | ∞ | — | |

In the Tables 52 and 53, the surface #0 represents a light source, the surfaces #1 and #2 respectively represent surfaces of the diffraction grating (2A, 2B), the surfaces #3 and #4 respectively represent surfaces of the coupling lens (3A, 3B), the surfaces #5 and #6 respectively represent surfaces of the beam splitter 41, the surfaces #7 and #8 respectively represent surfaces of the beam splitter 42, the surface #9 and #10 respectively represent the surfaces 11 and 12 of the objective lens 10, and the surfaces #11 and #12 respectively represent the protective layer and the record surface of the corresponding optical disc. In Table 54, the surface #0 represents a light source, the surfaces #1 and #2 respectively represent surfaces of the diffraction grating (2C), the surfaces #3 and #4 respectively represent surfaces of the coupling lens (3C), and the surfaces #5 and #6 respectively represent surfaces of the beam splitter 42, the surface #7 and #8 respectively represent the surfaces 11 and 12 of the objective lens 10, and the surfaces #9 and #10 respectively represent the protective layer and the record surface of the corresponding optical disc.

Each of the disc side surfaces (surface #4) of the coupling lenses 3A, 3B and 3C and the surfaces 11 and 12 of the objective lens 10 is a rotationally-symmetrical aspherical surface.

The following Table 55 shows the cone constants K and aspherical coefficients specifying the shape of each of the disc side surface (surface #4) of the coupling lens 3A and the surfaces 11 and 12 of the objective lens 10. The following Table 56 shows the cone constant κ and aspherical coefficients specifying the shape of the disc side surface (surface #4) of the coupling lens 3B. The following Table 57 shows the cone constant K and aspherical coefficients specifying the shape of the disc side surface (surface #4) of the coupling lens 3C.

TABLE 55

| Surface No. | κ | A4 | A6 | A8 | A10 | A12 |
|---|---|---|---|---|---|---|
| 4 | 0.0000 | 3.8700E−04 | −2.2000E−08 | 0.0000E+00 | 0.0000E+00 | 0.0000E+00 |
| 9(1st Area) | −0.7500 | 3.0400E−02 | −1.9390E−03 | 9.7410E−04 | −1.0510E−04 | 6.4555E−05 |
| 9(2nd Area) | −0.7500 | 3.4650E−02 | −5.4110E−03 | 2.4050E−03 | −6.7640E−04 | 1.8310E−04 |
| 9(3rd Area) | −0.7500 | 3.0000E−02 | −7.2950E−03 | 7.6000E−03 | −2.6765E−03 | 4.8883E−04 |
| 10 | 0.0000 | 5.1390E−01 | −1.2440E+00 | 2.0540E+00 | −1.8780E+00 | −2.3440E−01 |

| | A14 | A16 | A18 | A20 | A22 | A24 |
|---|---|---|---|---|---|---|
| 4 | 0.0000E+00 | 0.0000E+00 | 0.0000E+00 | 0.0000E+00 | 0.0000E+00 | 0.0000E+00 |
| 9(1st Area) | 0.0000E+00 | 0.0000E+00 | 0.0000E+00 | 0.0000E+00 | 0.0000E+00 | 0.0000E+00 |
| 9(2nd Area) | 0.0000E+00 | 0.0000E+00 | 0.0000E+00 | 0.0000E+00 | 0.0000E+00 | 0.0000E+00 |
| 9(3rd Area) | 0.0000E+00 | 0.0000E+00 | 0.0000E+00 | 0.0000E+00 | 0.0000E+00 | 0.0000E+00 |
| 10 | 1.3840E+00 | 2.3000E+00 | −5.4750E+00 | 1.9830E+00 | 1.0180E+00 | 0.0000E+00 |

TABLE 56

| Surface No. | κ | A4 | A6 | A8 | A10 | A12 |
|---|---|---|---|---|---|---|
| 4 | 0.0000 | 6.2620E−05 | 3.7080E−07 | 1.8790E−09 | 0.0000E+00 | 0.0000E+00 |

| | A14 | A16 | A18 | A20 | A22 | A24 |
|---|---|---|---|---|---|---|
| 4 | 0.0000E+00 | 0.0000E+00 | 0.0000E+00 | 0.0000E+00 | 0.0000E+00 | 0.0000E+00 |

TABLE 57

| Surface No. | κ | A4 | A6 | A8 | A10 | A12 |
|---|---|---|---|---|---|---|
| 4 | 0.0000 | 2.5980E−05 | 2.4250E−07 | 2.0000E−09 | 0.0000E+00 | 0.0000E+00 |
| | A14 | A16 | A18 | A20 | A22 | A24 |
| 4 | 0.0000E+00 | 0.0000E+00 | 0.0000E+00 | 0.0000E+00 | 0.0000E+00 | 0.0000E+00 |

Table 58 shows the coefficients Pn of the optical path difference function defining the diffraction lens structure formed on each of the first to third areas on the surface 11 of the objective lens 10 and the surface #4 of the coupling lenses 3A. The diffraction lens structure formed on the surface #4 of the coupling lenses 3A corrects the chromatic aberration. The second area on the surface 11 of the objective lens 10 is configured to converge the first laser beam having the wavelength of 405 nm and the second laser beam having the wavelength of 660 nm onto the record surfaces of the first and second optical discs, respectively, and not to contribute to convergence of the third laser beam having the wavelength of 790 nm. The third area is configured to converge only the first laser beam having the wavelength of 405 nm.

The diffraction lens structure in the second area is formed as a combination of a step giving an optical path length difference approximately equal to $2\lambda_1$ ($\lambda_1$=405 nm) or $-\lambda_1$ and a step giving an optical path length difference approximately equal to $5\lambda_1$ or $-5\lambda_1$. The diffraction lens structure in the third area is configured such that each step gives an optical path length difference approximately equal to $1\lambda_1$.

TABLE 58

| Surface No. | P2 | P4 | P6 | P8 | P10 | P12 |
|---|---|---|---|---|---|---|
| 4 | −3.0000E+01 | 0.0000E+00 | 0.0000E+00 | 0.0000E+00 | 0.0000E+00 | 0.0000E+00 |
| 1st Area | 0.0000E+00 | 1.0610E+01 | −5.5400E+00 | 3.4300E−01 | −6.8080E−02 | 0.0000E+00 |
| 2nd Area (1) | 0.0000E+00 | 1.1690E+01 | −6.5890E+00 | 5.1940E−01 | 0.0000E+00 | 0.0000E+00 |
| 2nd Area (2) | 0.0000E+00 | 7.7930E−01 | −3.9540E−01 | 0.0000E+00 | 0.0000E+00 | 0.0000E+00 |
| 3rd Area | 0.0000E+00 | 1.4800E+01 | −6.1310E+00 | 0.0000E+00 | 0.0000E+00 | 0.0000E+00 |

Table 59 shows diffraction orders of the first to third laser beams defined by the diffraction lens structures. In Table 59, effective radiuses of the first to third areas are also shown.

TABLE 59

| | 1st Laser Beam | 2nd Laser Beam | 3rd Laser Beam | Effective Radius |
|---|---|---|---|---|
| 1st Area | 2 | 1 | 1 | 1.185 |
| 2nd Area (1) | 2 | 1 | — | 1.430 |
| 2nd Area (2) | 5 | 3 | — | — |
| 3rd Area | 1 | — | — | 1.645 |

Table 60 shows values of the intermediate terms of the conditions (1), (4), (6)-(9).

TABLE 60

| Condition | Value |
|---|---|
| (1), (6) | −0.172 |
| (7) | 0.172 |
| (4) | 0.000 |
| (8) | −0.264 |
| (9) | 2.15 |

As can be seen from Table 60, the optical pick-up 100 according to the sixth embodiment satisfies the conditions (1), (4) and (6)-(9).

FIGS. 19A-19C show the spherical aberration caused in the optical pick-up 100 according to the sixth embodiment. More specifically, FIG. 19A is a graph illustrating the spherical aberration caused when the first optical disc is used, FIG. 19B is a graph illustrating the spherical aberration caused when the second optical disc is used, and FIG. 19C is a graph illustrating the spherical aberration caused when the third optical disc is used. In each of FIGS. 19A-19C, a curve indicated by a solid line represents the spherical aberration at a design wavelength, and a curve indicated by a dashed line represents the spherical aberration caused when the wavelength of the laser beam shifts by +5 nm from the design wavelength.

FIG. 20 is a graph illustrating the wavefront aberration caused when the temperature changes by +30 degrees. In FIG. 20, a curve indicated by a thick solid line represents the wavefront aberration (0.024λ rms) caused in the sixth embodiment Although the present invention has been described in considerable detail with reference to certain preferred embodiments thereof, other embodiments are possible.

This application claims priority of Japanese Patent Application No. P2007-217313, filed on Aug. 23, 2007. The entire subject matter of the application is incorporated herein by reference.

What is claimed is:

1. An optical pick-up used for recording information to and/or reproducing information from at least three types of optical discs, by selectively using one of three types of light beams including a first light beam having a shortest wavelength of $\lambda_1$, a second light beam having a wavelength of $\lambda_2$ longer than the wavelength of the first light beam and a third light beam having a longest wavelength of $\lambda_3$, the at least three types of optical discs including a first optical disc having a highest recording density, a second optical disc having a recording density lower than that of the first optical disc, and a third optical disc having a lowest recording density, when protective layer thicknesses of the first, second and third optical discs are represented by t1, t2 and t3, respectively, the protective layer thicknesses satisfying a condition of t1≦t2<t3, the optical pick-up comprising:

a first light source that emits the first light beam when the first optical disc is used;

a second light source that emits the second light beam when the second optical disc is used;

a third light source that emits the third light beam when the third optical disc is used;

a first coupling lens; and an objective lens formed to converge each of the first, second and third light beams onto the first, second and third optical discs, respectively, wherein the objective lens has a step structure including a plurality of concentrically formed refractive surface zones divided by steps, the step structure having a function of giving, at each step, an optical path length difference of approximately $2\lambda_1$ to the first light beam;

wherein the first coupling lens causes the first light beam to be incident on the objective lens as a converging beam, wherein if f1 and M1 respectively represent a focal length and magnification of the objective lens defined when the first optical disc is used, and f2 and M2 respectively represent a focal length and magnification of the objective lens defined when the second optical disc is used, the objective lens is positioned to satisfy a condition (1):

$-0.35 < f2 \times M2 - f1 \times M1 < -0.07$ (1).

2. The optical pick-up according to claim 1,
wherein when numerical apertures required for information reproducing or information recording on the first, second and third optical discs are defined as NA1, NA2 and NA3, respectively, the numerical apertures satisfy following relationships:

(NA1>NA3); and (NA2>NA3), wherein the objective lens has a first region for securing the numerical aperture NA3, wherein in the first region, the step structure provides the function of giving, at each step, the optical path length difference of approximately $2\lambda_1$ to the first light beam.

3. The optical pick-up according to claim 1,
wherein:

each of the protective layer thicknesses t1 and t2 of the first and second optical discs is approximately 0.6 mm, and the protective layer thickness t3 of the third optical disc is approximately 1.2 mm, and the objective lens is positioned to satisfy a condition:

$-0.25 < f2 \times M2 - f1 \times M1 < -0.07$ (2).

4. The optical pick-up according to claim 3,
wherein the objective lens is positioned to satisfy a condition:

$0.05 < f1 \times M1 < 0.25$ (3).

5. The optical pick-up according to claim 3,
wherein the objective lens is positioned to satisfy a condition:

$-0.02 < f2 \times M2 < 0.02$ (4).

6. The optical pick-up according to claim 3,
wherein if f3 and M3 respectively represent a focal length and magnification of the objective lens defined when the third optical disc is used, the objective lens is positioned to satisfy a condition:

$-0.26 < f3 \times M3 - f1 \times M1 < -0.15$ (5).

7. The optical pick-up according to claim 1,
wherein the protective layer thicknesses t1, t2 and t3 of the first to third optical discs satisfy conditions:

$t3 - t1 \geq 1.0$ mm; and $t2 \approx 0.6$ mm, wherein the objective lens is positioned to satisfy a condition:

$-0.35 < f2 \times M2 - f1 \times M1 < -0.17$ (6).

8. The optical pick-up according to claim 7,
wherein the objective lens is positioned to satisfy a condition:

$0.10 < f1 \times M1 < 0.35$ (7).

9. The optical pick-up according to claim 7,
wherein the objective lens is positioned to satisfy a condition:

$-0.02 < f2 \times M2 < 0.02$ (4).

10. The optical pick-up according to claim 7,
wherein the objective lens is positioned to satisfy a condition:

$-0.31 < f3 \times M3 - f1 \times M1 < -0.20$ (8).

11. The optical pick-up according to claim 2,
wherein:

the objective lens has a second region formed outside the first region;

the second region is configured to converge the first and second light beams onto the first and second optical discs, respectively, and not to contribute to convergence of the third light beam; and the step structure in the second region includes a step which gives an optical path length difference approximately equal to $2\lambda_1$ or $-2\lambda_1$ to the first light beam and a step which gives an optical path length difference approximately equal to $5\lambda_1$ or $-5\lambda_1$ to the first light beam.

12. The optical pick-up according to claim 11,
wherein:

an effective beam diameter of the first light beam defined when the first light beam is incident on the objective lens is larger than an effective beam diameter of the second light beam defined when the second light beam is incident on the objective lens;

the objective lens has a third region formed outside the second region;

the third region is configured to converge only the first light beam onto the first optical disc, and not to contribute to convergence of the second and third light beams; and the step structure in the third region gives, to the first light beam, an optical path length difference which is different from an optical path length difference given to the first light beam by the step structure in the second region.

13. The optical pick-up according to claim 12,
wherein the step structure in the third region includes a step which gives an optical path length difference approximately equal to $\lambda_1$ or $-\lambda_1$ to the first light beam.

14. The optical pick-up according to claim 11, wherein:
an effective beam diameter of the first light beam defined when the first light beam is incident on the objective lens is smaller than an effective beam diameter of the second light beam defined when the second light beam is incident on the objective lens;
the objective lens has a third region formed outside the second region;
the third region is configured to converge only the second light beam onto the second optical disc, and not to contribute to convergence of the first and third light beams; and
the step structure in the third region gives, to the second light beam, an optical path length difference which is different from an optical path length difference given to the second light beam by the step structure in the second region.

15. The optical pick-up according to claim 14,
wherein the step structure in the third region includes a step which gives an optical path length difference approximately equal to $\lambda_2$ or $-\lambda_2$ to the second light beam.

16. The optical pick-up according to claim 1, further comprising at least one second coupling lens which causes the second and third light beams to be incident on the objective lens in first and second predetermined states, respectively.

17. An optical pick-up used for recording information to and/or reproducing information from at least three types of optical discs, by selectively using one of three types of light beams including a first light beam having a shortest wavelength of $\lambda_1$, a second light beam having a wavelength of $\lambda_2$ longer than the wavelength of the first light beam and a third light beam having a longest wavelength of $\lambda_3$,
the at least three types of optical discs including a first optical disc having a highest recording density, a second optical disc having a recording density lower than that of the first optical disc, and a third optical disc having a lowest recording density,
when protective layer thicknesses of the first, second and third optical discs are represented by t1, t2 and t3, respectively, the protective layer thicknesses satisfying a condition of t1≦t2<t3,
when numerical apertures required for information reproducing or information recording on the first, second and third optical discs are defined as NA1, NA2 and NA3, respectively, the numerical apertures satisfying following relationships:

(NA1>NA3); and (NA2>NA3), the optical pick-up comprising:
a first light source that emits the first light beam when the first optical disc is used;
a second light source that emits the second light beam when the second optical disc is used;
a third light source that emits the third light beam when the third optical disc is used;
a first coupling lens; and
an objective lens formed to converge each of the first, second and third light beams onto the first, second and third optical discs, respectively,
wherein the objective lens has a step structure including a plurality of concentrically formed refractive surface zones divided by steps,
wherein the first coupling lens causes the first light beam to be incident on the objective lens as a converging beam
wherein the objective lens has a first region for securing the numerical aperture NA3,
wherein in the first region, the step structure gives, at each step, an optical path length difference of approximately $2\lambda_1$ to the first light beam.

* * * * *